United States Patent
Hang et al.

[19]

[11] Patent Number: 6,121,603

[45] Date of Patent: Sep. 19, 2000

[54] OPTICAL CONFOCAL DEVICE HAVING A COMMON LIGHT DIRECTING MEANS

[76] Inventors: Zhijiang Hang, 60 S. Bedford St., Woburn, Mass. 01801; Victor Lazarev, 6 Baron Park La., Burlington, Mass. 01803; Robert H. Webb, 8 Old Country Rd., Lincoln, Mass. 01773

[21] Appl. No.: 08/982,103

[22] Filed: Dec. 1, 1997

[51] Int. Cl.$^7$ .................................................. H01J 3/14
[52] U.S. Cl. .................. 250/216; 250/201.3; 250/208.1; 257/82
[58] Field of Search .................................. 250/234, 235, 250/216, 208.1, 214.1, 201.3; 257/80–84; 372/21, 22, 70

[56] References Cited

U.S. PATENT DOCUMENTS

| | | | |
|---|---|---|---|
| 5,028,802 | 7/1991 | Webb et al. | 250/235 |
| 5,034,613 | 7/1991 | Denk et al. | 250/458.1 |
| 5,071,246 | 12/1991 | Blaha et al. | 351/221 |
| 5,120,953 | 6/1992 | Harris | 250/227.2 |
| 5,296,703 | 3/1994 | Tsien | 250/235 |
| 5,325,386 | 6/1994 | Jewell et al. | 372/50 |
| 5,386,112 | 1/1995 | Dixon | 250/234 |
| 5,430,509 | 7/1995 | Kobayashi | 351/221 |
| 5,450,501 | 9/1995 | Smid | 382/26 |
| 5,512,749 | 4/1996 | Iddan et al. | 250/332 |
| 5,524,479 | 6/1996 | Harp et al. | 73/105 |
| 5,532,873 | 7/1996 | Dixon | 359/388 |
| 5,563,710 | 10/1996 | Webb et al. | 356/445 |
| 5,568,463 | 10/1996 | Sahara et al. | 369/112 |
| 5,771,218 | 6/1998 | Feldman et al. | 257/98 |

OTHER PUBLICATIONS

Mojmir Petran, Milan Hadravsky, M. David Egger, Robert Galambos, Tandem–scanning reflected–light microscope, Journal of the Optical Society of America, May 1968, 661–664, 58–5, US.

Robert H. Webb, George W. Hughes, Francois C. Delori, Confocal scanning laser ophthalmoscope, Apr. 15, 1987, 1492–1499, 26–8, Optical Society of America, US.

Shinya Inoue, Foundation of confocal scanned imaging in light microscopy, Handbook of biological confocal microscopy, James B. Pawlay, Ed., 1995, 1–17, Plenum Press, New York, US (month unknown).

(List continued on next page.)

*Primary Examiner*—Que T. Le
*Attorney, Agent, or Firm*—O'Connell Law Firm

[57] ABSTRACT

A confocal scanning imaging device for viewing an object, includes illumination means including an array of independently addressable microlasers, detection means including an array of detectors for detecting light from an object to which light from the illumination means has been directed. The array of microlasers and the array of detectors are combined into a single array, such as on a single chip, and in a pattern constructed and arranged so that different detectors are adjacent each microlaser so that light from an illuminated object may be directed back to the vicinity of the illuminating microlaser and be detected by the adjacent detector(s). There is optical means for directing light generated by the microlasers onto an object and for directing light from an object so illuminated onto detectors adjacent the illuminating microlaser. The optical means includes a bilens and a matching lens system including two objective lenses. The system is constructed so that the relationships are as follows:

$$\Delta = \delta_1 f_1 / f_2$$

$$\delta_2 = \delta_1 f_3 / f_1$$

where $\Delta$ is the distance between the optical centers of the bilens, $\delta 2$ is the distance between sequentially illuminated points on the object, $\delta 1$ is the distance between neighboring elements in the array, the focal length of the bilens is $f_2$ and the focal length of the objective lens nearest the array is $f_1$ and the focal length of the objective lens furthest from the array is $f_3$.

36 Claims, 13 Drawing Sheets

OTHER PUBLICATIONS

Kent D. Choquette, W. W. Chow, M. Hagerott Crawford, K. M. Geib, R. P. Schneider, Jr., Threshold investigation of oxide–confined vertical–cavity laser diodes, Applied Physics Letters, Jun. 24, 1996, 3689–3691, 68–26, American Institute of Physics, US.

G.G. Oritiz, C.P. Hains, J. Cheng, H.Q. Hou, J.C. Zolper, Monolithic integration of In0.2Ga0.8As vertical–cavity surface–emitting lasers with resonance–enhanced quantum well photodetectors, Electronics Letters, Jun. 20, 1996, 1205–1206, 32–13, US.

Joseph R. Lakowicz, Principles of fluorescence spectroscopy, 1973, 53–56, Plenum Press, New York, US. (Month Unknown).

Kristian Helmerson, Rani Kishore, William D. Phillips, Howard H. Weetall, Optical tweezers–based immunosensor detects femtomolar concentrations of antigens, Clinical Chemistry, 1997, 379–383, 43–2, US. (Month unknown).

Judith R. Mourant, Irving J. Bigio, James Boyer, Richard L. Conn, Tamara Johnson, Tsutomu Shimada, Spectroscopic diagnosis of bladder cancer with elastic light scattering, Lasers in Surgery and Medicine, 1995, 350–357, Wiley–Liss, Inc., US. (Month unknown).

OPTICAL CONFOCAL DEVICE HAVING A COMMON LIGHT DIRECTING MEANS

FIELD OF THE INVENTION

The present invention relates generally to optical instruments and methods, and, more particularly, to scanning confocal devices for scanning an object with an optical beam, detecting the light remitted from or reflected by the object, and generating an image of the object.

BACKGROUND OF THE INVENTION

Confocal imaging techniques include the illumination of objects with a "flying spot" and the detection of light which is reflected from or otherwise remitted by the currently illuminated point on the object located only in the image plane. This provides a better spatial resolution, better contrast to the image, fast image acquisition and less depth of field, than conventional optical devices. The small depth of field allows the creation of 3-D images of semi-transparent objects.

Scanning imaging techniques are employed in confocal laser scanning microscopes (CLSM), tandem scanning microscopes (TSM), scanning laser ophthalmoscopes (SLO), and other applications.

A TSM is discussed in Petran et al, "Tandem-Scanning Reflected-Light Microscope," *Journal of the Optical Society of America* 1968 Vol. 58, No. 5, pp 661–664. Petran et al acknowledge that reflected-light microscopy of semi-transparent material is usually unsatisfactory because of low contrast and light scattering. They describe the TSM, in which both the object plane and the image plane are scanned in tandem. In the Peteran et al system, the object is illuminated with light passing through holes in one sector or side of a rotating scanning disk, known as a Nipkow disk. The scanning disk is imaged by the objective at the object plane. Reflected-light images of these spots thereby produced are directed to the diametrically opposite side of the same disk. Light can pass from the source to the object plane, and, from the object plane to the image plane, only through optically congruent holes on diametrically opposite sides of the rotating disk.

Tandem scanning confocal arrangement, however, are "light-starved" by the limited brightness of the illumination spot. TSM systems, in addition, are hampered by stray light scattered from the moving pinhole array.

Current flying spot systems benefit from the advent of the laser. They use moving optical elements for deflecting a laser beam, so that an illumination spot is swept across the object to be scanned.

A recent version of a CLSM is described in U.S. Pat. No. 5,532,873 of Dixon. The scanning of the laser beam is provided by two mirrors, rotationally oscillating around axes which are perpendicular to each other.

A confocal scanning laser ophthalmoscope (CSLO) is disclosed in Webb et al, "Confocal Scanning Laser Ophthalmoscope," *Applied Optics,* Vol. 26, No. 8, Apr. 15, 1987, pp 1492–1499. The apparatus uses multiple scanning elements, including a multifaceted rotating polygonal reflector scanner, to provide scanning of both incident and reflected light at television-rate frequencies. The CSLO scans an illumination spot over the fundus of an eye, and synchronously scans a detector over the image.

Other confocal devices, are discussed in *The Handbook of Biological Confocal Microscopy,* 2nd edition. Pawley, ed., Plenum Press, 1995.

Conventional scanning devices of the type discussed, require a multiplicity of mechanical components moving at high speed. They are typically bulky and require significant power to drive the scanning mechanism.

A confocal scanning device without moving parts is described in U.S. Pat. No. 5,028,802 of Webb et al. FIG. 1A of the present application (which is FIG. 1C of the '802 patent) provides a summary of the Webb et al invention and is prior art. FIG. 1B of the present application, (FIG. 3 of the '802 patent) and shows the preferred embodiment of the '802 patent.

Referring to FIG. 1C of the '802 patent (FIG. 1A of the present application), the scanning arrangement employs N×M array 10 of microlasers 12 in a scanning mode as the illumination source. As shown in FIG. 1A of the present application (FIG. 1C of Webb) the device includes laser scan drive 16 for energizing the lasers of array 10. The microlasers are energized sequentially, so that the array is scanned in a conventional TV raster fashion. The array is imaged on the object 18 to be illuminated, thereby providing raster illumination of the object. Light 19 emitted from the object, by reflection, scatter or transmission, is then detected by detector 20 and the detection signal, carried on line 21, is displayed synchronously with the array scan, to provide a video image on a monitor or other image output device 22 driven by SYNCH signals provided by drive 16 on line 24.

Referring to FIG. 1B of the present application (FIG. 3 of Webb), a confocal scanning configuration uses a detector array having independently addressable photodiodes, that are optically congruent to microlasers. Lens L directs light from scanned source array 10 onto the object plane OB, and light reflected from the object is directed to detector 20 by beam splitter S. A lens L' is used to direct light reflected from the object onto discrete photodiodes of a detector array 20'. These photodiodes are read individually, in a pattern that is, synchronized with the scanning-illumination of the object. Thus, light scattered from non-illuminated portions of the object does not contribute to the output of the detection device, unless it impinges upon the selected portion of the detector. As a result, noise due to unwanted scattered light is significantly reduced.

U.S. Pat. No. 5,034,613 to Denk et al issued Jul. 23, 1991, for Two-Photon Laser Microscopy discloses a laser scanning microscope in which fluorescent light is detected in a manner which avoids photo-bleaching.

U.S. Pat. No. 5,071,246 to Blaha et al issued Dec. 10, 1991, for Confocal Scanning Ophthalmoscope discloses the use of light wave conductors.

U.S. Pat. No. 5,120,953 to Harris issued Jun. 9, 1992, for Scanning Confocal Microscope Including A Single Fiber For Transmitting Light To and Receiving Light From An Object discloses the use of optical fibers for transmitting light and a light separator to divert the return light to a detector.

U.S. Pat. No. 5,296,703 to Tsien issued Mar. 22, 1994, for Scanning Confocal Microscope Using Fluorescence Detection discloses use of a beam of radiation and detection of the resulting fluorescence using beam splitters and rotatable scanning mirrors and a raster scan display.

U.S. Pat. No. 5,325,386 to Jewell et al issued Jun. 28, 1994, for Vertical-Cavity Surface Emitting Laser Array Display System discloses the use of vertical cavity surface emitting lasers in an array to enhance a display.

U.S. Pat. No. 5,386,112 to Dixon issued Jan. 31, 1995, for Apparatus and Method for Transmitted-Light and Reflected-Light Imaging discloses a microscope using a series of beam splitters and mirrors and light which is reflected is separated from light which is transmitted.

U.S. Pat. No. 5,430,509 to Kobayashi issued Jul. 4, 1995, for Scanning Laser Ophthalmoscope discloses use of beam splitters and mirrors and uses at least three scanning systems.

U.S. Pat. No. 5,450,501 to Smid issued Sep. 12, 1995, for Apparatus for the Point-by-Point Scanning of an Object uses frequency selective filtration to operate a system having transmission of light through the object being viewed.

U.S. Pat. No. 5,512,749 to Iddan et al issued Apr. 30, 1996, for Infrared Microscope discloses use of a cryogenic detection device and an IR array of detectors including a scanning mirror for scanning the object.

U.S. Pat. No. 5,524,479 to Harp et al issued Jun. 11, 1996, for Detecting System for Scanning Microscopes discloses use of a cantilevered arm as the probe to examine the object to be viewed.

U.S. Pat. No. 5,563,710 to Webb issued Oct. 8, 1996, for Imaging System With Confocally Self-Detecting Laser discloses using an array of lasers and a single detector. Also, light reflected from the object effects the lasers which then forward the light to the detector.

U.S. Pat. No. 5,568,463 to Sahara et al issued Oct. 22, 1996, for Semiconductor Laser Device To detect A Divided Reflected Light Beam discloses an optical device for detecting a magneto-optical signal in which a light-emitting portion and a light receiving portion are closely disposed on a common substrate.

BRIEF SUMMARY OF THE INVENTION

A general object of the present invention is to provide improved confocal imaging methods and apparatus without use of moving parts in the construction.

A further object of the present invention is to provide such methods and apparatus affording high spatial resolution and enhanced brightness of the image.

Another object of the present invention is to provide such imaging methods and apparatus which is capable of being implemented in a compact and reliable embodiment.

A further object of the present invention is to provide a confocal scanning device which is arranged so that multiple areas of a target may be scanned simultaneously, which greatly reduces image acquisition time.

Another object of the present invention is to provide a small angle beam splitter (SABS) in a confocal arrangement which permits of extremely small angle shifts for light beams.

A further object of the present invention is to provide a device of the type described which is arranged to be used as a microscope.

An additional object of the present invention is to provide a device of the type described which is arranged to be used as an ophthalmoscope.

A yet further object of the present invention is to provide a confocal device and method which may be accomplished using light fiber bundles, both coherent and non-coherent type.

A yet additional object of the present invention is to provide for the imaging of an object in fluorescent light.

A further yet object of the present invention is to provide a two-photon confocal device which is versatile and compact.

One aspect of the present invention includes a combined array of independently excitable light sources and independently readable detectors, and optical elements for directing the light generated by the light sources of the array onto the object for directing light that is reflected, fluoresced or scattered from the object onto the detectors of the array. There may be rows of light sources and detectors which are interleaved in a combined array. The source/detector array and optical elements can be, and preferably are, stationary relative to one another and relative to the object.

A small angle beam splitter is provided to deflect the reflected and remitted light from the object to the detectors. Since the spacing between adjacent microlasers and detectors is quite small, a bilens is used to provide this shift. The requirement imposed upon such a bilens for there to be some difference (e.g., $5\mu$) between the lenses and this is difficult at best to make. Therefore, an optical system is used so that the requirements imposed on the bilens can be more in the order of one mm rather than 5 $\mu$m. If the spacing between adjacent lasers and detectors is in the range of 10–90$\mu$, then the difference in the bilens would be in the range of 5–45$\mu$ since the difference in the bilens is one half the spacing of laser to detector.

Each embodiment according to the present invention can be used for the imaging of an object in fluorescent light. The fluorescence technique is used both in ophthalmoscopy for the imaging of a blood vessel picture of the retina and in various applications of microscopy, especially when it is desired to obtain a 3-D view of tissue. It provides high sensitivity to the presence of small amounts of fluorescent substances. The laser scanning technique produces excitation in a target material by absorption of photons to provide thereby intrinsic three-dimensional resolution. The confocal technique additionally brings better image contrast and the opportunity for 3-D fluorescent imaging.

The combined laser/detector array can be arranged for the simultaneous exciting of several spaced light sources which are reflected or otherwise returned to the array where they are detected as long as the direct or reflected, refracted or fluoresced light from the different light sources does not adversely influence any of the other simultaneously excited light sources/detectors combinations. This can provide a several-fold increase in the speed of scanning an object with a confocal device.

Other objects, features and advantages will be apparent from the following detailed description of preferred embodiments taken in conjunction with the accompanying drawings in which:

DETAILED DESCRIPTION OF THE PREFERRED EMBODIMENTS

Figure 2A:
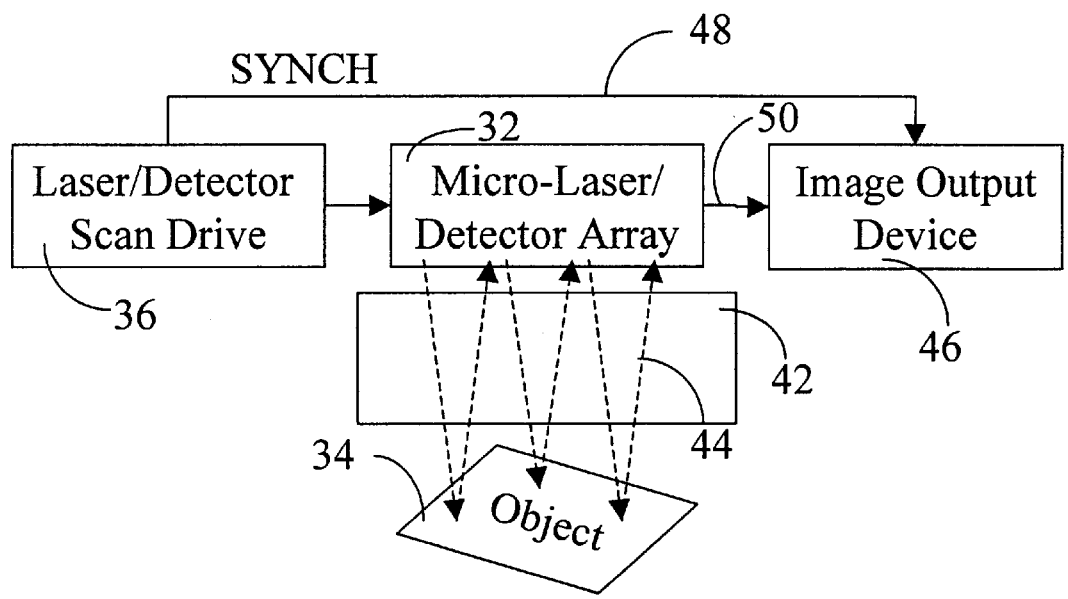
FIG. 2A is a diagrammatic block diagram of a scannable microlaser device of the present invention.
Figure 2B:
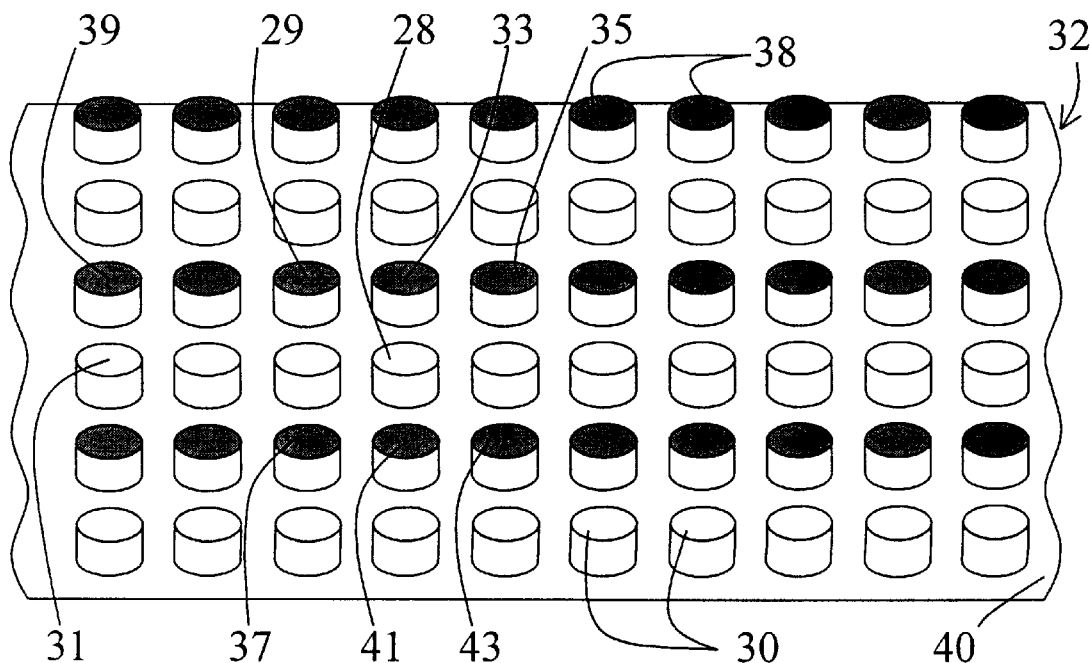
FIG. 2B is a schematic diagram of a combined array of microlasers and detectors.

The Broad Concept—FIGS. 2A and 2B

Figure 1A:
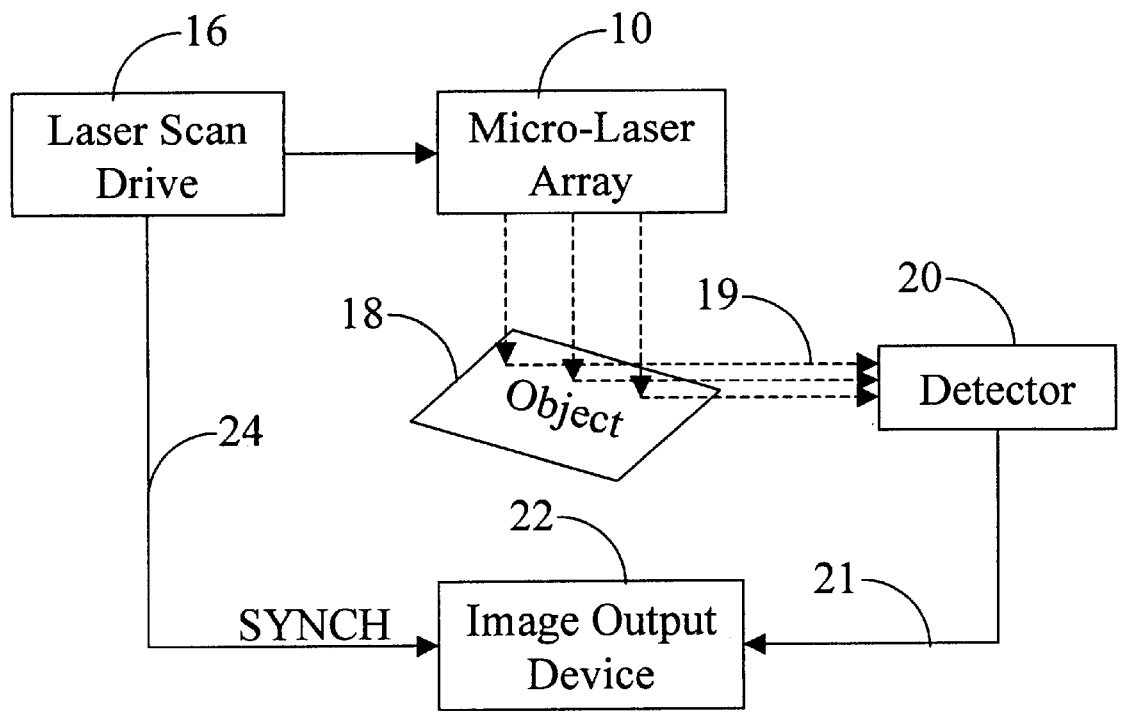
FIG. 1A is a diagrammatic block diagram of the prior art as shown in U.S. Pat. No. 5,532,873.

The present invention provides confocal scanning imaging methods and apparatus, as shown in FIGS. 2A and 2B, that employ an array of microlasers 30 in a scanning mode as the illumination source, an array of detectors 38 in a scanning mode interleaved with the microlasers 30 on the same substrate 40, and an optical system 42 that provides the optical congruency of both arrays. The invention preferably includes a combined array 32 as shown in FIGS. 2A and 2B. A comparison of FIG. 2A (the invention) with FIG. 1A (the prior art) shows the reduction in size for the device of the present invention. That is, the same size array as used only for the microlasers in the prior art, is used for the combined array of microlasers and detectors, in the present invention.

Referring to FIGS. 2A and 2B, microlasers 30 in a combined laser/detector array 32 are imaged on the object 34 to be illuminated to provide raster illumination of the object. The light 44, reflected from or scattered, or in some cases fluoresced, by the object 34, is directed to the same array 32, but slightly shifted to be projected onto detectors 38. The detection signal carried on line 50 is displayed synchronously with the array scan, to provide a video image on a monitor or other image output device 46 driven by SYNCH signals provided by drive 36 on line 48. In FIG. 2B, as well as in the other figures, lasers are marked with open circles and detectors are marked with shaded circles or solid black. Drive 36 provides the direction of scanning lines, in the raster of sequentially activated lasers and the reading of neighboring detectors, to be perpendicular to the interlaced lines of lasers 30 and detectors 38 in array 32.

Current microlasers have threshold currents as low as 250 $\mu A$, threshold voltages as low as 2V, 50% power conversion efficiency, and output powers as high as 15 mW [Choquette et al "Threshold investigation of oxide-confined vertical cavity laser diodes." Applied Physics Letters 1996, Vol. 68, pp 3689–3691]. Among the variety of existing photodetectors, Resonance Cavity Photo Detectors (RCPD) are preferable to be included with VCSELs in the combined laser/detector chip. Their quantum efficiency reach as high as 85% [Ortiz et al "Monolithic integration of $In_{0.2}Ga_{0.8}AS$ vertical-cavity surface-emitting lasers with resonance-enhanced quantum well photodetectors", Electronics Letters 1996, Vol. 32, No 13, pp 1205–1207]. Their structure can be realized by chemically removing some of the AlAs/AlGaAs quarter-wave layers from the top mirror of VCSEL's cavity. Therefore, the combined laser/detector chip can be created from an array of VCSELs. Existing VCSEL arrays consist of microlasers with apertures of 10–25 $\mu m$, centered at 25–40 $\mu m$.

A laser and detector array with control integrated-circuits can be bound together as a single chip by so-called flip-bounding technique.

Figure 3A:
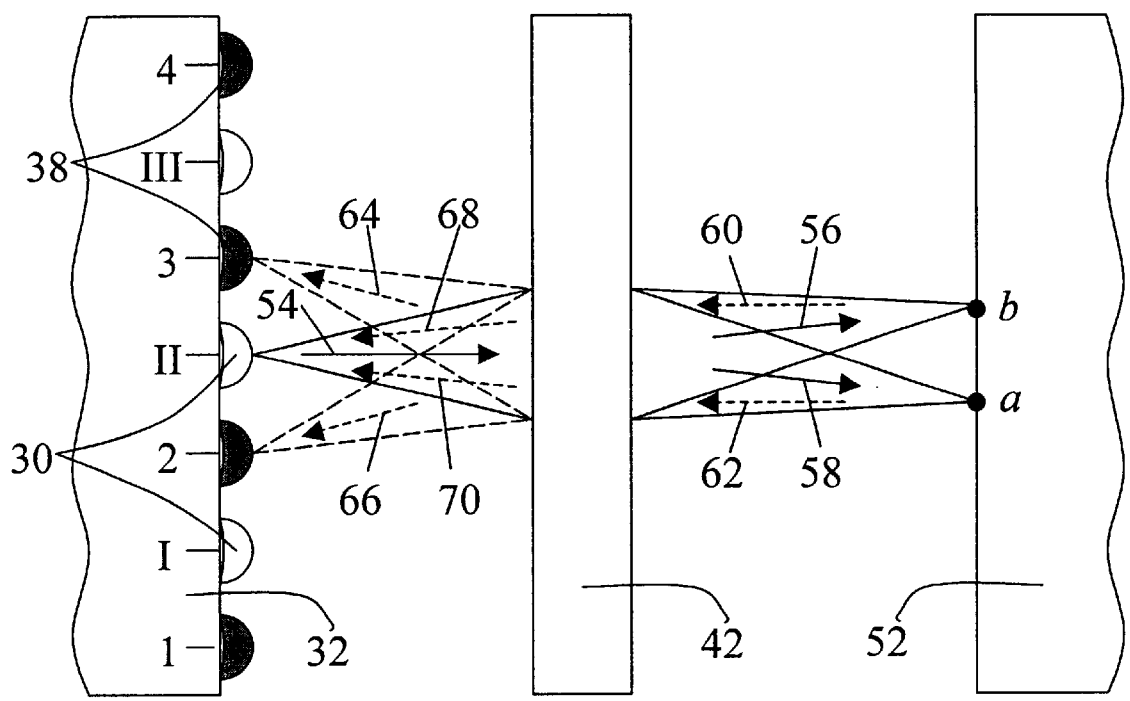
FIG. 3A is a diagrammatic view of a confocal scanning device of the present invention.
Figure 3B:
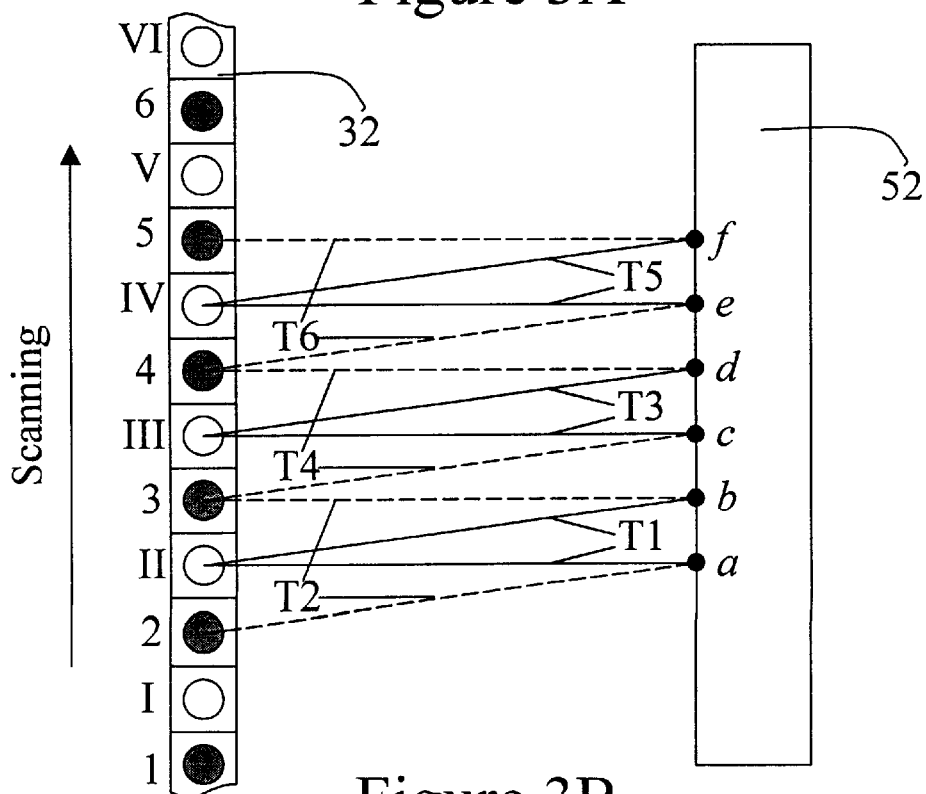
FIG. 3B is a schematic view showing the sequence of operation of the microlasers and detectors associated therewith, as well as points on the object which are illuminated.
Figure 3C:
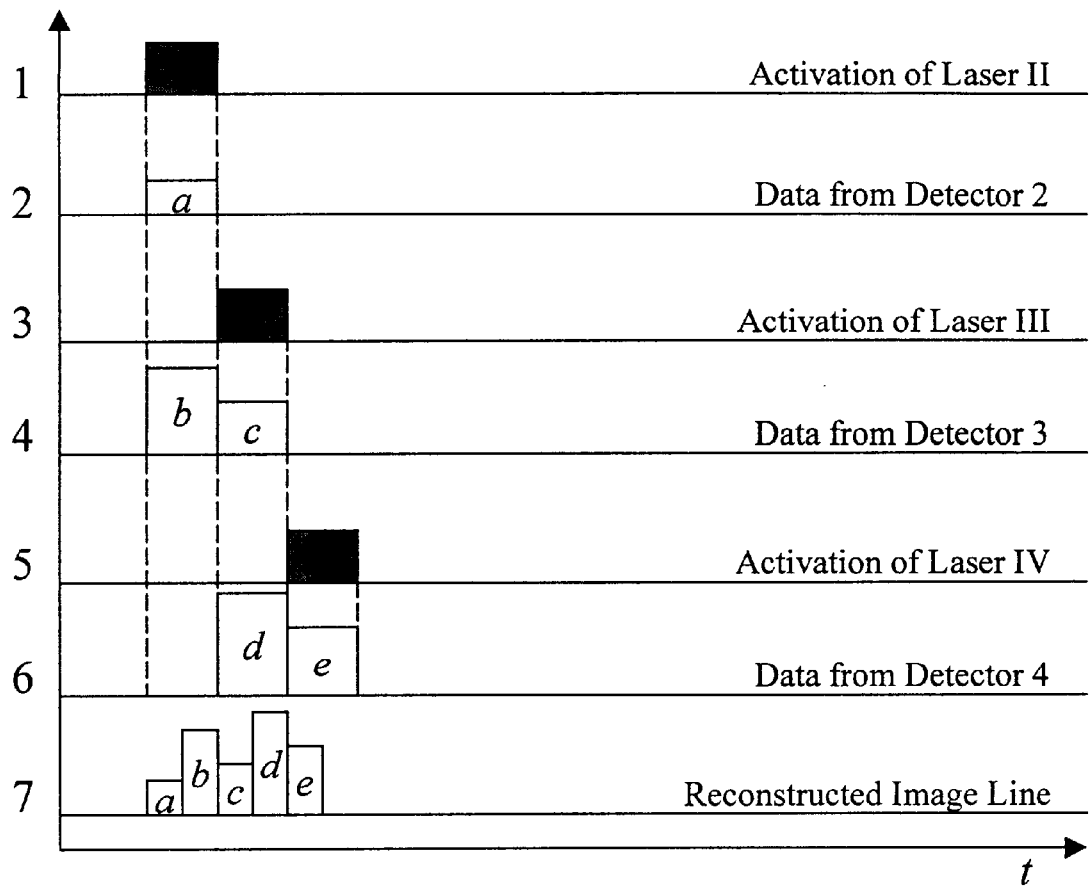
FIG. 3C is a graphical showing of the time charts in the operation of the scanning microlaser device of FIGS. 3A and 3B.

More Details of The Concept—FIGS. 3A, 3B and 3C

The small distance between neighboring lasers and detectors in a combined array requires the presence of a Small Angle Beam Splitter (SABS) in the optical system of the device. The distinction in operation of such a system versus that of conventional beam splitters (FIG. 1B) is shown in FIGS. 3A, 3B and 3C.

FIG. 3A shows the arrangement of microlaser/detector array, optical system and object and indicates the light patterns as transmitted and received.

FIG. 3B shows schematically the sequence of object illumination and of light detection during the scanning of lasers. Lasers are numbered with Roman digits, detectors with Arabic digits and alpha-characters designate the sequentially illuminated points on the object. Solid lines join each laser and points on the object illuminated from this laser. Dashed lines join illuminated points with corresponding detectors. The optical system is not shown in FIG. 3B since the lines shown therein are not light beams, but just indications of the directions and sequence of flow.

Thus, as shown in FIG. 3A, when microlaser "II" is activated (the sequence is the same for microlaser "I" except that the points on the object are slightly different and the detectors are slightly different) it produces light, the rays thereof being indicated by arrow 54, and the optical system 42 with the SABS produces two sets of rays of interest 56 and 58 which illuminate spots or points "b" and "a", respectively, on the object 52 from the currently operating laser 30 identified as "II". The light from each point "b" and "a" is reflected back as shown by arrows 60 and 62, respectively, to SABS 42 and is split again as shown by arrows 64, 66, 68 and 70. Part of the light, as shown by arrows 68 and 70 meets the array plane in initial position where the laser "II" is located. Another part of the light, as shown by arrows 64 and 66 is in shifted position with the detectors. Light designated by arrow 64 impinging upon detector "3" and light designated by arrow 66 impinging upon detector "2". The switching over to the next laser "III" in the array causes the illumination of the next pair of object points "c" and "d" and the light from these points impinges upon detectors "3" and "4".

FIGS. 3B and 3C show the sequence of laser and detector activation as well as time charts for laser and detector activation, as well as the method of image reconstruction from the data obtained from the detectors. FIG. 3B shows diagramatically the sequencing of the operation of the individual microlasers and detectors in the combined array. Looking at the second microlaser labeled "II", it is actuated at the first time point of interest and light is emitted and sent to points "a" and "b" as shown by sequence lines T1 indicating activation of microlaser "II" and impinging of light at points "a" and "b". In FIG. 3C this is shown on line 1 of the time chart. Light from points "a" and "b" is reflected back and some impinges on detector "2" (see line 2 of the time chart) and, at the same time, some impinges on detector "3" (see line 4 of the time chart). The latter sequence is shown by sequence lines T2 in FIG. 3B. Next, microlaser "III" is activated as shown by line 3 of the time chart. This is shown by sequence lines T3 in FIG. 3B.

Light from points "c" and "d" is reflected back and some impinges on detector "3" (see line 4 of the time chart) and, at the same time, some impinges on detector "4" (see line 6 of the time chart). The latter sequence is shown by sequence lines T4 in FIG. 3B. Next, microlaser "IV" is activated as shown by line 5 of the time chart. This is shown by sequence lines T5 in FIG. 3B. Light from points "e" and "f" is reflected back and some impinges on detector "4" (see line 6 of the time chart) as indicated by sequence lines T6. The process continues in this manner until the entire combined array has been used to provide light to the object and detect light from the object being viewed.

The section-lined rectangles in FIG. 3C are the time gates for the activation of the lasers. The height of the boxes with the characters indicates the intensity of the signal detected from corresponding points on the object. The ordered detectors data are saved in the frame memory buffer of the image output device 46 of FIG. 2A and will be displayed during the next frame, during which time the new data set is detected. Because of simultaneous detection of signals from two points on the object, the time interval of detection for each of them is two times the interval of its display. This is because spots "a" and "b" are illuminated at the same instant, but in the display, "b" must be after "a". This can be useful for the accumulation of signals to reduce the noise.

Therefore, the concept of the combined laser/detector array integrated with the concept of the SABS provides the design of confocal devices without moving parts with significant advantages. The SABS is required so that there is a shift of light by the distance from center to center between adjacent microlasers and detectors. This could be in the range of 25–40 $\mu$m.

Figure 1B:
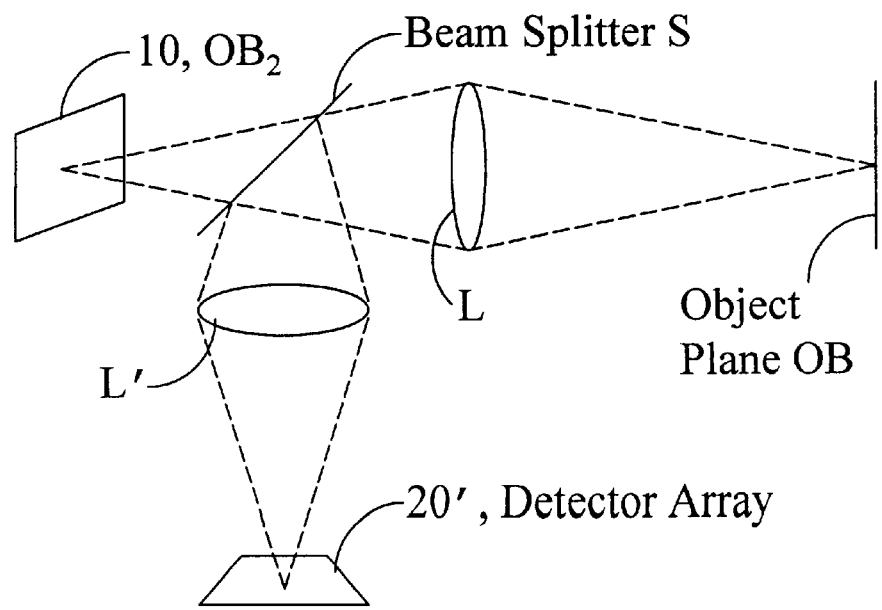
FIG. 1B is a diagrammatic view of a confocal scanning microscope of the prior art as shown in U.S. Pat. No. 5,532,873.

There are four points to be made concerning this construction:

First, the combination of two chips 10, 20' in FIG. 1B into only one chip 32 in FIG. 2A reduces the overall size of the device, since a separate array of detectors in a different location than the microlaser array, is no longer required.

Second, according to the arrangement shown in FIGS. 3A and 3B the spatial resolution of the image in this case depends on the total number of elements in the combined chip and not on the number of lasers or detectors separately. Therefore, the resolution is the same for both schematics (FIGS. 1A and 2A) if the integration level of the combined chip is equal to that of the laser or detector chip in FIG. 1B. This is because of the size and number. Even though there may be ½ as many detectors, since each detector is used for 2 points on the object, the same resolution is provided, e.g., detector "2" detects from point "b" and from point "c", whereas the previous arrangement only used a detector for 1 point on the object.

Third, the amount of light that is used for illumination of each point is the same for both types of arrangements although the light of each laser is divided into two parts in the version of the present invention. According to the version in FIG. 1B, half of the light from the laser is not used by the system because it is lost in the reflection from the beam splitter S.

Fourth, the time interval for the detection of light from each point on the object for the combined chip is twice as long as explained above in connection with FIGS. 3A, 3B and 3C, and this can reduce noise due to accumulation of signals.

Figure 4A:
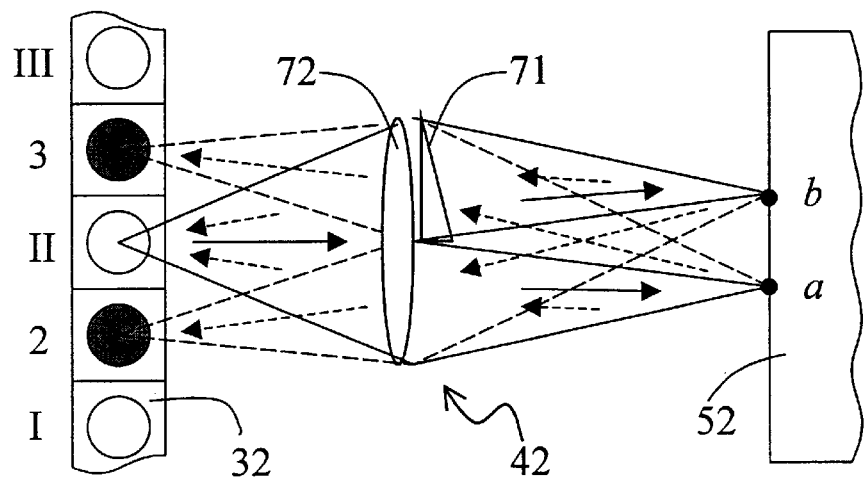
FIG. 4A is a schematic view of a first embodiment of an SABS for the confocal scanning device.
Figure 4B:
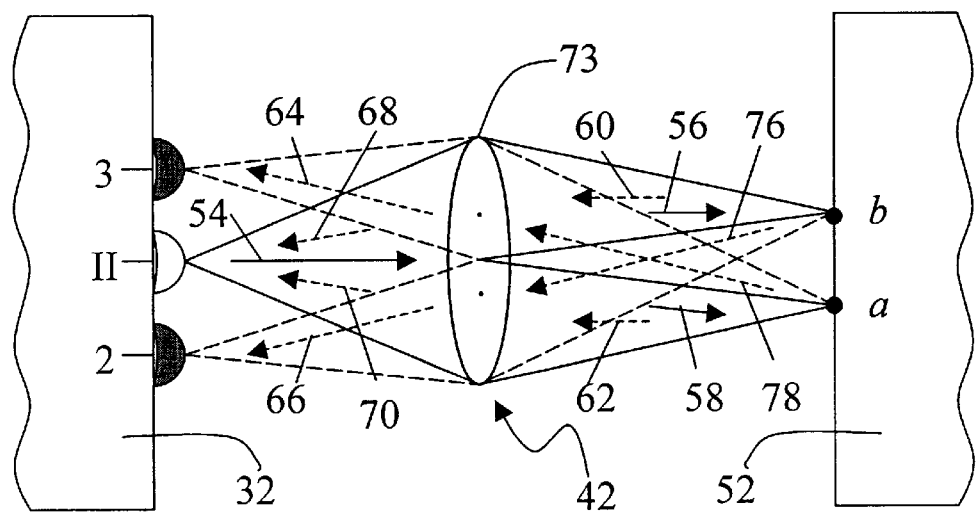
FIG. 4B is a schematic view of another embodiment of an SABS for the confocal scanning device.
Figure 4B:
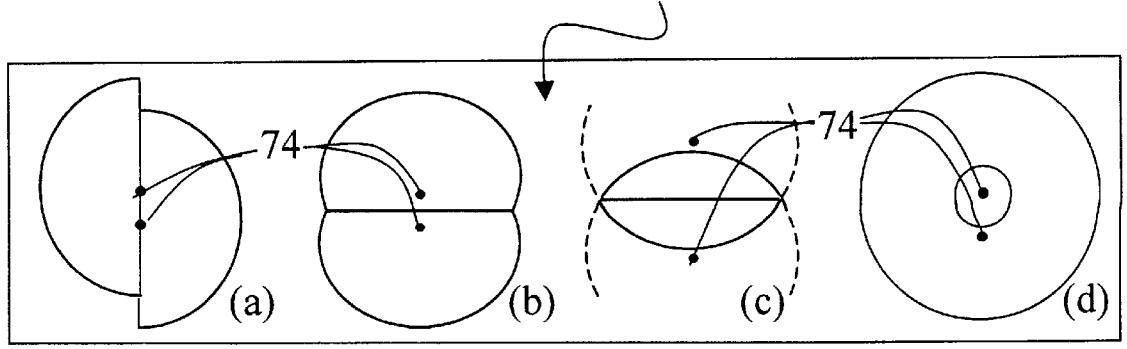

FIGS. 4A and 4B

Small Angle Beam Splitter (SABS) for a Confocal Laser Scanning Device

An SABS for a confocal scanning device is shown in FIGS. 4A and 4B using the principles shown and described in connection with FIGS. 2A and 2B, and 3A, 3B and 3C.

In FIG. 4A the small angular displacement needed for the light shift from the laser to the adjacent detector is provided by a thin prism 71 installed immediately adjacent to objective lens 72 and overlapping the half of the pupil. A diffraction grating 71 can be used to perform the same function in this schematic as a prism.

FIG. 4B shows the more preferable embodiment based on a split lens or bilens 73. This is a lens consisting of two parts with shifted optical centers 74 but with the same optical power. The different versions of bilens are shown in the inset box as (a), (b), (c) and (d). The purpose is to provide a function which deflects the light sufficiently that the reflected and scattered light shifts ultimately the distance between the laser and the detector. The version (d) of the bilens is good for the well-collimated beam of microlaser which fills only the central part of the bilens. The beam of remitted light from the object, which is formed as a wider cone, is collected by the peripheral part of the bilens and is shifted due to the shifted optical center of this part.

As shown in FIG. 4B, when microlaser "II" is activated it produces light, the rays thereof being indicated by arrow 54, and the optical system 42 with the SABS produces two sets of rays of interest 56 and 58 which illuminate spots or points "b" and "a", respectively, on the object 52 from the currently operating laser 30 identified as "II". The light from each point "b" and "a" is reflected back as shown by arrows 60 and 62, respectively, to SABS 42 and is split again as shown by arrows 64, 66, 68 and 70. Part of the light, as shown by arrows 68 and 70 meets the array plane in initial position where the laser "II" is located. Another part of the light, as shown by arrows 64 and 66 is in shifted position with the detectors. Light designated by arrow 64 impinging upon detector "3" and light designated by arrow 66 impinging upon detector "2".

Since the bilens 73 is used as the SABS in this embodiment, there are other light rays of interest. These are shown by arrow 76 which is the light coming from point "b" on the object which passes through the lower portion of bilens 73, and arrow 78 which is the light coming from point "a" on the object which passes through the upper portion of bilens 73.

The bilens 73 and the lasers and detectors are arranged so that in FIG. 4B a light ray can pass from point "a" through the upper half of bilens 73 and to detector "3" so that the ray goes through the lens at a point where there is no refraction of this beam. Also, the arrangement is provided that a light ray can pass from point "b" through the lower half of bilens 73 and to detector "2" so that the ray goes through the lens at a point where there is no refraction of this beam.

If a bilens alone were to be used, the shift would be required to be one half the distance between adjacent or coordinated lasers and detectors in the array. For example, if the laser-detector spacing is 10–20$\mu$, the bilens shift would be required to be in the order of 5–10 $\mu$m and it is extremely difficult (if even possible) to make a bilens with such precision, that is, with such a small difference between the two lenses. This problem is solved in the present invention using a complex optical system in which bilens shift could be one mm and still provide the required deflection. This is based upon the formulas which are set forth and explained in detail in the detailed description of FIGS. 5A, 5B and 5C.

In order to reduce the time for imaging acquisition in the present invention, more than one laser/detector combination on the chip can be turned on simultaneously, as long as there is no cross talk between the detectors. With conventional confocal microscopy, it is not possible to detect multiple points simultaneously.

Figure 5A:
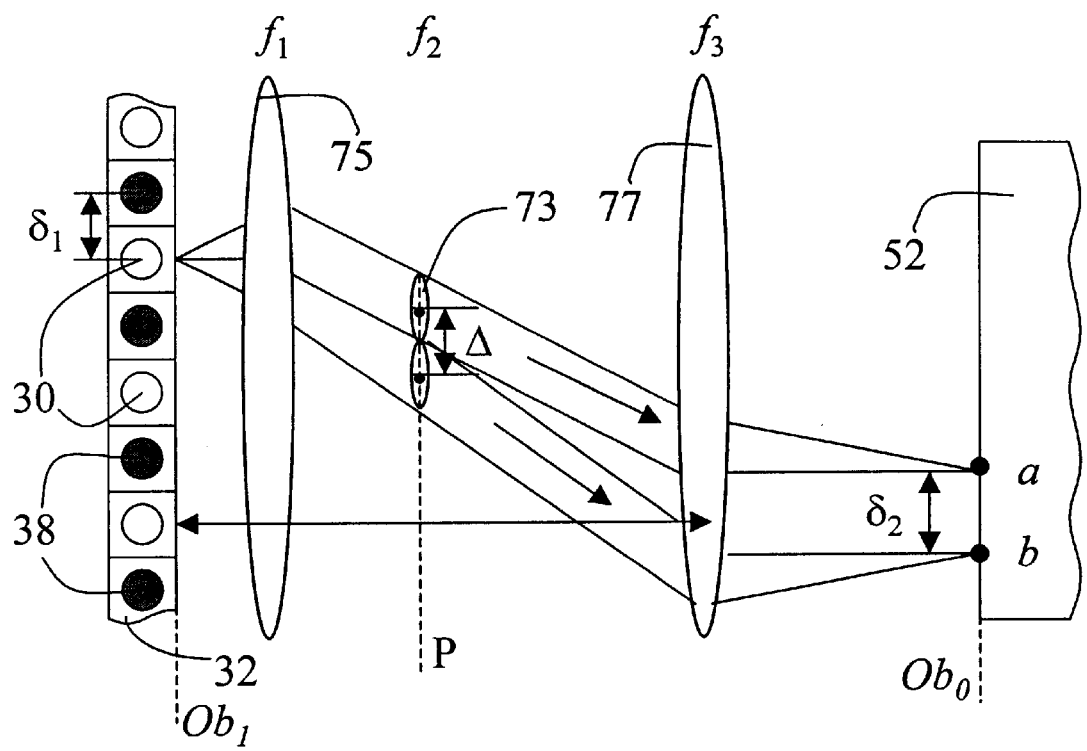
FIG. 5A is a schematic view of a confocal scanning microscope using a bilens illustrating the confocal illumination of two points on the object being viewed.
Figure 5B:
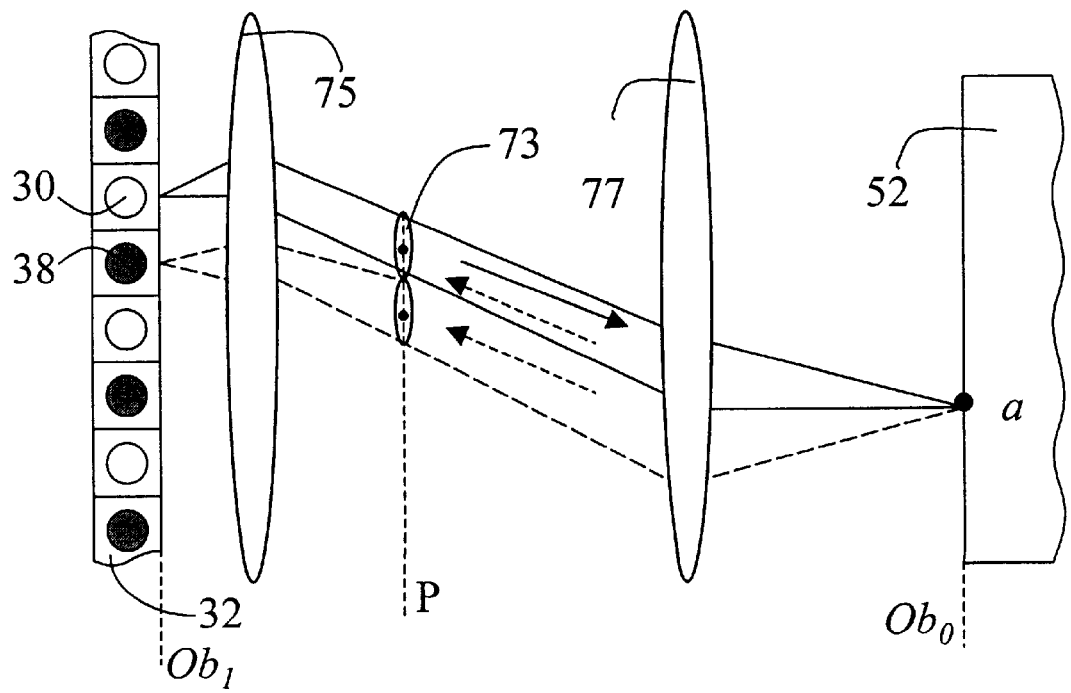
FIG. 5B is a schematic view of the microscope of FIG. 5A illustrating the confocal detection of one point on the object being viewed.
Figure 5C:
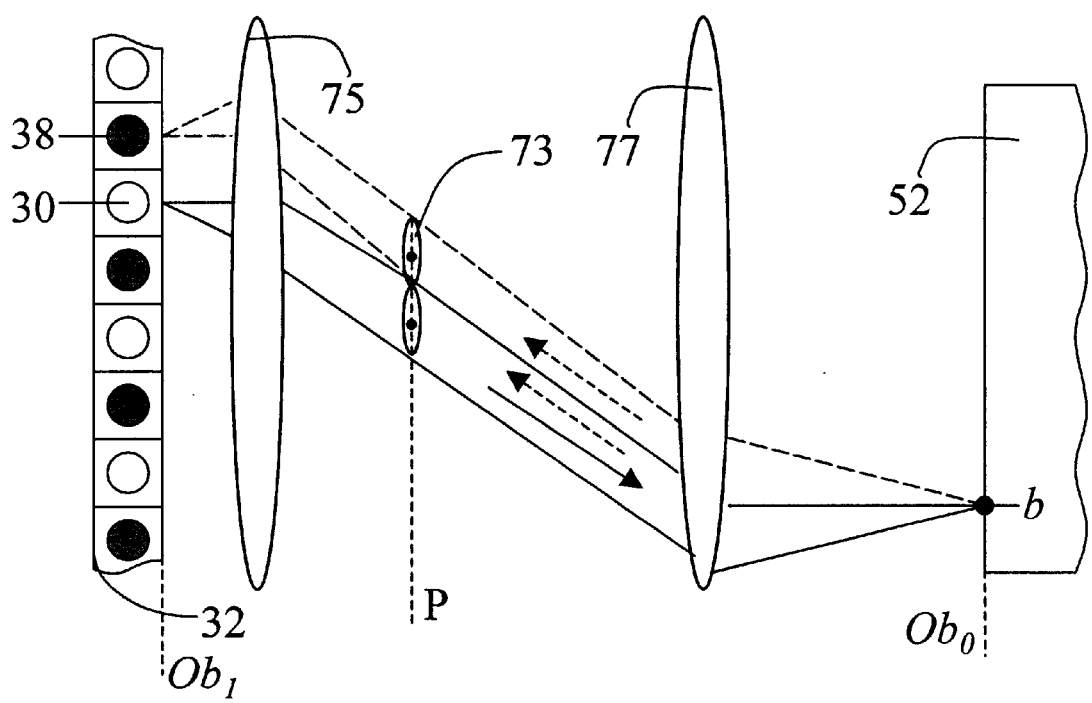
FIG. 5C is a schematic view of the microscope of FIG. 5A illustrating the confocal detection of another point on the object being viewed.

Confocal Laser Scanning Microscope—FIGS. 5A, 5B and 5C

FIGS. 5A, 5B and 5C are diagrammatic views showing of a confocal laser scanning microscope (CLSM) based on a combined array 32 of microlasers 30 and detectors 38 and on bilens 73. Bilens 73 is installed in the pupil plane P of an optical system comprising two objective lenses 75 and 77. FIG. 5A demonstrates the confocal illumination of two points "a" and "b" on object 52. FIG. 5B shows the confocal detection of point "a", FIG. 5C does so for the point "b".

FIG. 5A shows the light beams from the microlaser passing through the first objective lens 75, and the beams as they enter bilens 73, and also the beams between the bilens and the second objective lens 77, as well as the beam as they impinge upon both points "a" and "b".

FIG. 5B shows the light beams as they leave the microlaser 30 and pass through the three lenses 75, 73 and 77, and impinge upon point "a" on the object 52, as well as the light which is reflected and remitted from point "a" back through lenses 77, 73 and 75 to impinge upon the detector 38 immediately below the just activated microlaser 30.

FIG. 5C shows the light beams as they leave the microlaser 30 and pass through the three lenses 75, 73 and 77, and impinge upon point "b" on the object 52, as well as the light which is reflected and remitted from point "b" back through lenses 77, 73 and 75 to impinge upon the detector 38 immediately above the just activated microlaser 30.

Let the focal lengths of the lenses 75, 73 and 77 be correspondingly $f_1$, $f_2$ and $f_3$. If the distance between neighboring elements of array 32 is $\delta 1$, then:

$$\Delta = \delta_1 f_1 / f_2$$

$$\delta_2 = \delta_1 f_3 / f_1$$

where $\Delta$ is the distance between the optical centers of bilens, $\delta 2$ is the distance between sequentially illuminated point on the object.

The first of the equations is important because it allows one to create a bilens with centers shift that is significantly more than required shift of image at the array plane $Ob_1$ when the optical power of bilens is much less than that of objective lens 75. This makes easy the creation of bilens. On the contrary, the spatial resolution over imaged object $\delta_2$ does not depend on the focal length of the bilens according to the second equation.

Figure 6A:
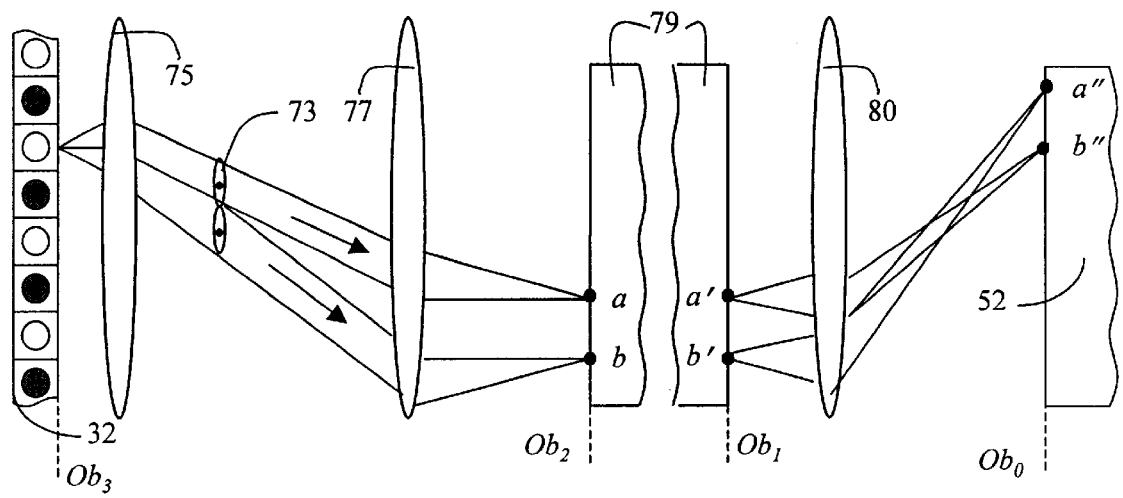
FIG. 6A is a schematic view of a confocal microscope for indirectly viewing an object.
Figure 6B:
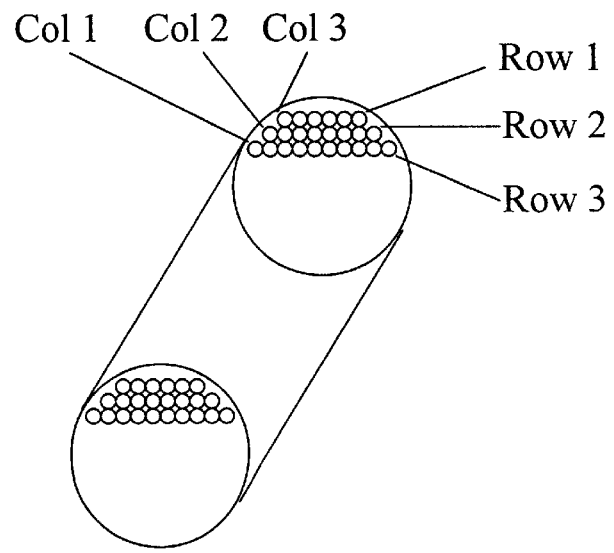
FIG. 6B is a detailed view of a bundle of fibers in a fiber optic bundle.

Confocal Scanning Device With A Remote Object—FIGS. 6A and 6B

FIG. 6A shows the embodiment of confocal microscope for the examination of not directly accessible object 52. It includes, additionally, fiber bundle 79 for the transfer of both light from microlasers and light returned from the object. The lens 80 provides the optical conjugation of the object $OB_1$ and distal end $OB_1$ of fiber bundle 79. The proximal end of fiber bundle $OB_2$ is placed in the same position as the object 52 in FIG. 5A. Therefore, during the work of each laser the image of a pair of simultaneously illuminated spots "a" and "b" on the proximal end of the fiber bundle is transferred on the distal end $Ob_1$ (points "a'" and "b'") and is projected onto the surface of object $Ob_0$ (points "a''" and "b''"). The light, reflected, scattered or fluoresced by the spots "a''" and "b''", is focused in the points "a'" and "b'" and transferred into the points "a" and "b". Since each fiber is aligned with a specific laser and specific detector, only two fibers from the bundle are used at a time for detection.

When fiber bundle 79 is coherent the light after that is detected by two detectors neighboring to emitting laser as shown in FIG. 5B and FIG. 5C. With coherent fibers spacing can be a problem since there is an offset from row to row, but this can be solved by producing the chip with similar spacing of the lasers and detectors.

Coherency with respect to a fiber bundle means that the order of fiber tips at the proximal and at the distal ends of the bundle is the same. Such bundles are used for the transfer of the image from one end of the bundle to the other. In the present invention the image of the object is obtained point by point and is then reconstructed. In this case the detection of object points may be done in any order, different from the order of their actual disposition. If the correspondence between the arrangement of points and the order of their detection is known, the reconstruction of image from detected data is possible. FIG. 6A shown the use of a coherent fiber bundle 79.

This concept allows the use of non-coherent fiber bundles. For example, FIG. 6B shows a fiber bundle 79' which is similar to fiber bundle 79 of FIG. 6A, except that it is a non-coherent bundle 79'. Such bundles are usually not used for imaging but only for illumination of the object. They are much less expensive than coherent bundles, and this reduces the price of the fiber confocal microscope according to the present invention. The use of such a fiber bundle will require the calibration procedure for each bundle that will establish the arrangement of stored data from detectors for the construction of correct image.

FIG. 6B shows such a non-coherent fiber bundle which is in the shape of a "U" just for illustration purposes, so that each end of the fiber bundle can be seen aligned with the other end. With a noncoherent fiber bundle, there is a difference from the coherent fiber bundle. A few rows and columns of fibers of the bundle are shown at each end. In a coherent bundle the fiber at row 1, column 1 at the proximal end of the bundle, is also at row 1, column 1 at the remote end of the bundle. However, in a non-coherent bundle, the fiber at row 1, column 1 at the proximal end, can be located anywhere at the remote end of the bundle, for example, at row 2, column 3. For each fiber bundle, the imaging scramble matrix from one end to the other end is unique and fixed. A laser array and a two-dimensional matrix-addressable detector array will be placed on imaging plane $Ob_3$, and the object plane $OB_0$ of FIG. 6A, respectively, to determine the imaging scramble conversion matrix. By sequentially turning on the laser and recording the coordinates of detectors which detect maximum laser light, one can obtain the fiber scramble matrix. A record is made of each and the information placed into a computer which then interprets the information so that when it is displayed, it is displayed as thought a coherent bundle was being used.

This calibration involves noting a fiber, for example at row 1, column 1, which corresponds with a particular laser or detector at the proximal end (to the array) and passing a light through it and noting where the other end of the fiber is located at the proximal end (in the fiber end-view), that is noting the row and column. When each of the fibers has been associated with a laser and detector at the proximal end, and the location of the other end of the fiber noted at the far end, this information can be placed into a computer associated with the display device so that when the results are displayed, the information at the far end will be coordinated with the particular lasers and detectors at the proximal end and the picture shown on the display device will be an accurate representation even though non-coherent fiber bundle has been used.

The array as shown in FIG. 2B is shown with the columns and rows aligned, but this may need to be changed, depending upon how the fibers in the bundle are aligned at the proximal end and at the remote end. For example, if the lasers and detectors are arranged as shown for the arrangement of fibers in FIG. 6B then each fiber end will be associated with a particular microlaser or detector.

Figure 7A:
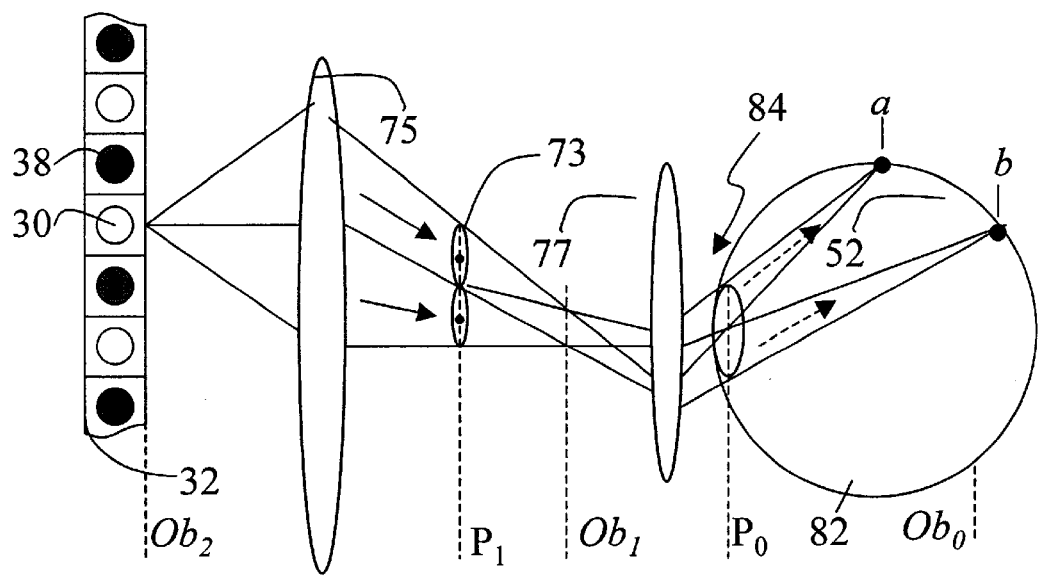
FIG. 7A is a schematic view of another embodiment of a confocal ophthalmoscope.
Figure 7B:
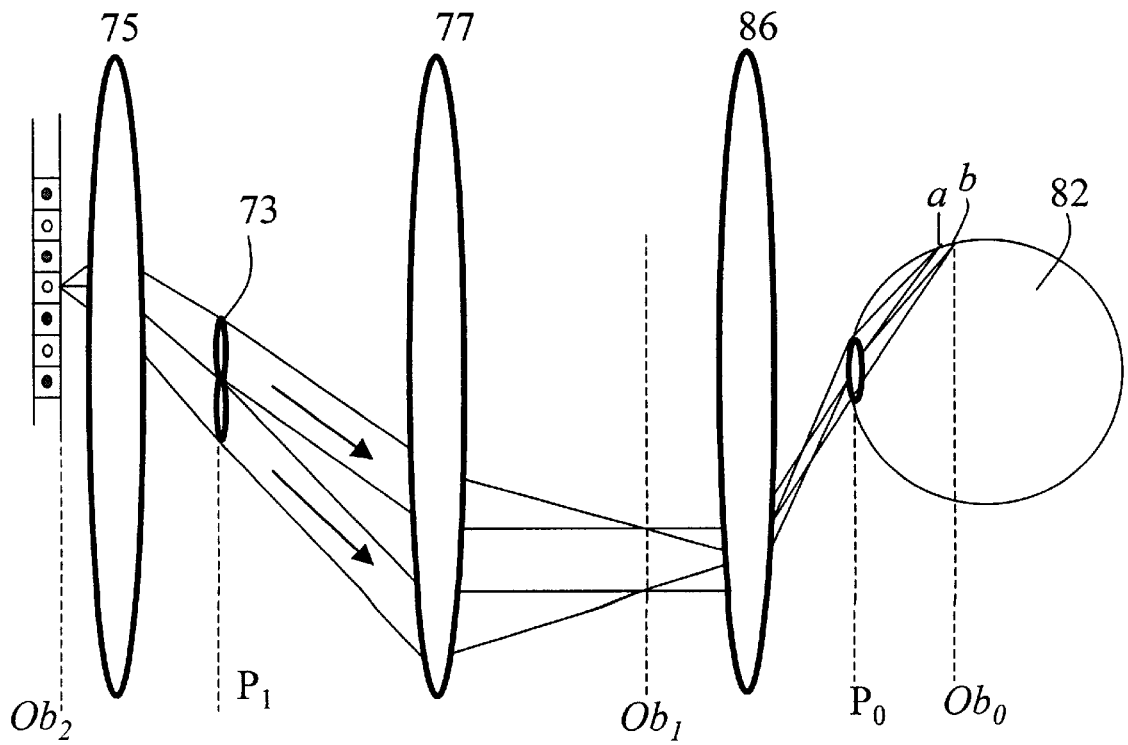
FIG. 7B is a schematic view of a further embodiment of a confocal ophthalmoscope similar to that of FIG. 7A.

Confocal Scanning Ophthalmoscope—FIGS. 7A and 7B

FIGS. 7A and 7B are diagrammatic views of the optical design of an ophthalmoscope according to the invention. The design of FIG. 7A is similar to that of FIG. 5A but the lens 77 produces parallel light beams 84 entering the eye 82 through the pupil in the plane $P_0$. The eye focuses the parallel beams on the retina at points "a" and "b". The bilens 73 is placed at the intermediate pupil plane $P_1$. The light of each microlaser 30 produces two illuminated spots "a" and "b" on the retina. The reflected and remitted or fluoresced light is detected by two detectors neighboring to the currently operating laser. The return light path is not specifically shown in FIG. 7A. Fluoresced light is involved when a dye is used, e.g., dye injected into a patient for this purpose. Lens 77 provides the conjugation of $P_1$ and $P_0$. Lens 77 is much stronger than a person's eyeglasses and therefore with only slight adjustment can focus on points "a" and "b" for persons who wear eyeglasses (to compensate for the persons own lenses not being perfect and therefore not focusing exactly on points "a" and "b".

Another embodiment of ophthalmoscope is shown in the FIG. 7B. Two lenses: 77 and 86 are used here, instead of only one 77 in the FIG. 7A, for creation of intermediate pupil at the plane $P_1$ where the bilens is placed. Lenses 77 and 86 form a telescopic system. For example, if a 3× magnification is desired for the telescopic system, the ratio of the focal lengths of lens 77 to lens 86 should be 3:1. This is useful in various situations, such as when a bright light is being used (or the room light is bright) and the iris of the eye closes down (and this could be to one mm). In such an event the magnification permits easy viewing even though the amount of light entering the eye is reduced due to the closing down of the person's iris. As a comparison, when there is little light, the iris could be 4–7 mm.

The lens 86 can be changed and one can adjust the ratio of diameter of the bilens to the pupil of the eye. The ratio of the bilens to the pupil of the eye is equal to the ratio of the focal length of lens 77 to the focal length of lens 86.

The lenses 77 and/or 86 can be changed to adjust the ratio of the focal lengths to provide different amounts of magnification to the telescopic system. This can also be done for the arrangement shown in FIG. 7A, but then the entire lens system needs to be adjusted.

Figure 8A:
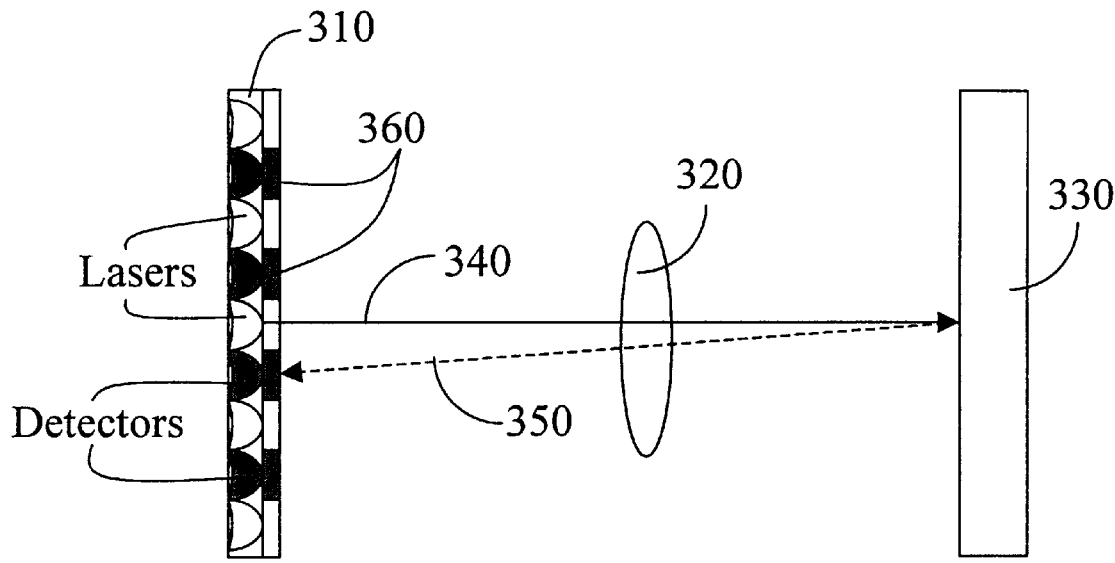
FIG. 8A is a schematic view of a confocal scanning fluorescence microscope.
Figure 8B:
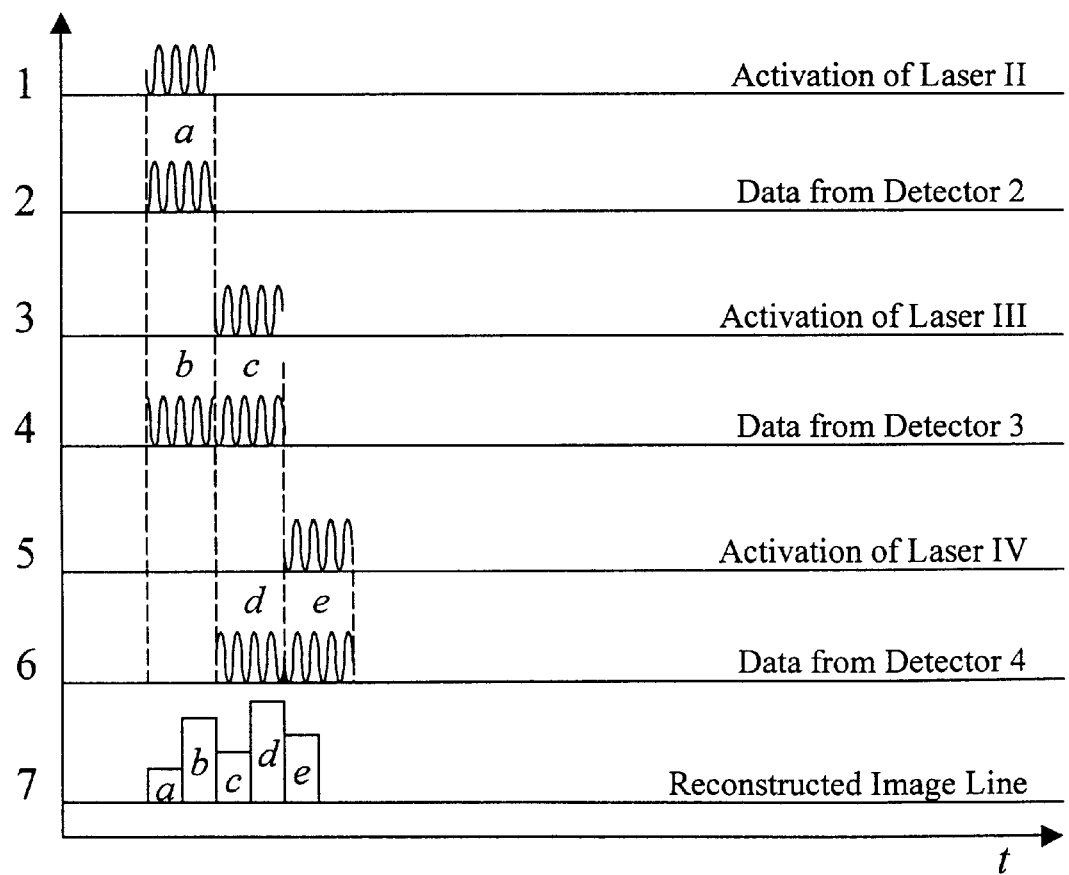
FIG. 8B is a graphical showing of the time charts in the fluorescence lifetime mode operation of the scanning microscope device.

Measurement of Fluorescence Intensity and Lifetime—FIG. 8A and 8B

Fluorescent light is spectrally shifted in relation to illumination light. Referring to FIG. 2B, detectors 38 in a combined laser/detector array 32 should be sensitive to the light with longer wavelength than the light emitted by microlasers 30, to detect fluorescence. In this case detectors can not have the same resonance cavity as microlasers. The light, reflected from the object, should not be detected, in order to increase the contrast of fluorescence image, since the reflected light from the image will reduce contrast. For this reason the rows of detectors 38 on the substrate 40 should be covered with a long-pass optical filter, which will cut-off the reflected light and will be transparent to fluorescent light. The making of such small optical filters is not a problem; they are widely used in the creation of color CCD chips.

The use of a modified chip, according to the description above, permits the detection of the distribution of fluorescence intensity over the object in all of the above described embodiments, when the intensity of each microlaser is steady during its operating period.

FIG. 8A shows a confocal scanning fluorescent microscope having a laser/detector array 310, in which the lasers emit light shown by arrow 340 which passes through the optical system 320 of one of the types disclosed herein, to impinge upon a point on object 330, which in this case could be a tissue sample. The light is reflected from this point and passes through optical system 320 as shown by arrow 350 and impinges upon a detector in the array 310. FIG. 8A shows (on the left side thereof) the two-dimensional laser/detector array 310 having lasers and detectors. The detectors are covered by a spectral filter 360 which allows the fluorescent light to the detectors and blocks the normal laser light from impinging upon the detectors. The fluorophore of tissue 330 is excited by the laser light 340 via lens system 320 and the emitted fluorescent light therefrom is detected by detectors on the laser/detector array 310. By sequencing the turning on of laser/detector pairs, the confocal fluorescence imaging can be detected.

The life-time of fluorescence provides important information about the chemical composition of an object. Some substances, like oxygen in liquid media, shorten the life-time, depending on their concentration. Therefore, the life-time image of an object corresponds to the distribution of the substance that quenches the detected fluorescence of specific fluorophores.

The application of phase method of life-time measurement [J. Lakowicz. "Principles of Fluorescence Spectroscopy." NY 1973] to the invention allows one to obtain the life-time image of an object. The confocal imaging of the lifetime will provide information about the tissue chemical compositions and dynamic behavior of the tissue cell.

The phase method is a measurement of the time delay between fluorphores fluorescence and excitation. When the period of modulation is close to the life-time of fluorescence, the phase shift between behaviors of excitation light and fluorescence is well-distinct and proportionate to the life-time.

The principle of construction of a life-time image is shown in FIG. 8B which is similar to FIG. 3C referring to the construction of the intensity of an image. The distinction of FIG. 8B from FIG. 3C is in the sine wave variation of microlaser intensity. Referring to FIG. 2A the laser/detector scan drive 36 can provide this variation by modulation of microlaser current. The frequency of such modulation can be in the GHz range. The corresponding period of modulation is close to the life-time of fluorescence, about several nano-seconds. Therefore, the number of cycles during the working interval of each laser can be high enough for measurement of the phase shift. If the number of elements in the combined laser/detector chip corresponds to VGA resolution $640 \times 480 = 3 \times 10^5$, the working interval should be equal to $30 \text{ ma}/1.5 \times 10^5 = 200$ nanoseconds for the real-time imaging. This is a sufficiently large interval to detect the phase shift between signals with 1 GHz frequency. The image output device 46 in FIG. 2A should provide such measurement for each illuminated point on the object. Returning to FIG. 8, the reconstructed image line should reflect phase shifts between microlaser light and fluorescence detected from each point on the object.

Retardance Imaging

The measurement of birefringence is of great importance both for microscopy and for ophthalmoscopy [Hocheimer and Kues "Retinal polarization effects," Applied Optics 1982 Vol. 21, pp. 3811–3818]. This phenomenon reflects the presence of anisotropic structures in objects, like microtubule polymers in cells and optical nerve fibers in the retina.

Polarized scanning confocal devices according to the present invention should contain the array of microlasers 30 in FIG. 2B emitting linear polarized light. This can be provided either by making a special form of their cavity or by placing polarizing filters on the rows of microlasers. The detectors 38 of the same substrate 40 should detect only the light, polarizing in direction, that is perpendicular to the laser light. This can be provided by location of corresponding polarizers on the rows of detectors of the substrate 40. Placing the quarter-wave plate between the substrate and other optical elements of any embodiment of the present invention will provide the optical schematic of circular polariscope. The intensity of the light detected by each detector 38 will depend on the retardance in the corresponding point on the object.

When linear polarization is used, the tissues being examined provide another type of polarization back to the detectors and this permits analysis of the tissue characteristics.

The commercial potential for a polarized confocal scanning microscope is difficult to predict at this time. For the cell biologist, this will be an enormously welcome tool to study anisotropy in biological material both in fixed as well as living specimens. Since the imaging could be done in "real time" (in at least video rates (30 frames/second) or better), there is the possibility there could be image changes in anisotropy during physiological processes such as signal transduction events, protein—protein interactions, DNA-protein interactions, and the like, in living cells. It also can be used to monitor the optical tweezers for measuring the force required to separate antigen-antibody bonds. [Kreistan Helmerson et al., "Optical tweezers-based immunosensor detects femtomolar concentrations of antigens," *Clinical Chemistry* 43:2, pp. 379–383 (1997)].

Figure 9A:
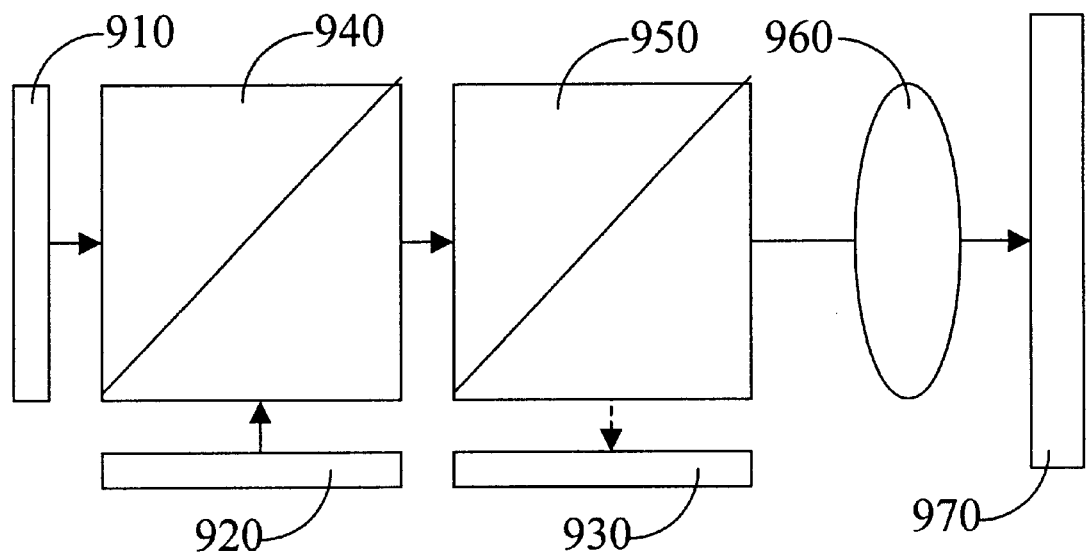
FIG. 9A is a schematic view of a two-photon fluorescence confocal microscope.
Figure 9B:
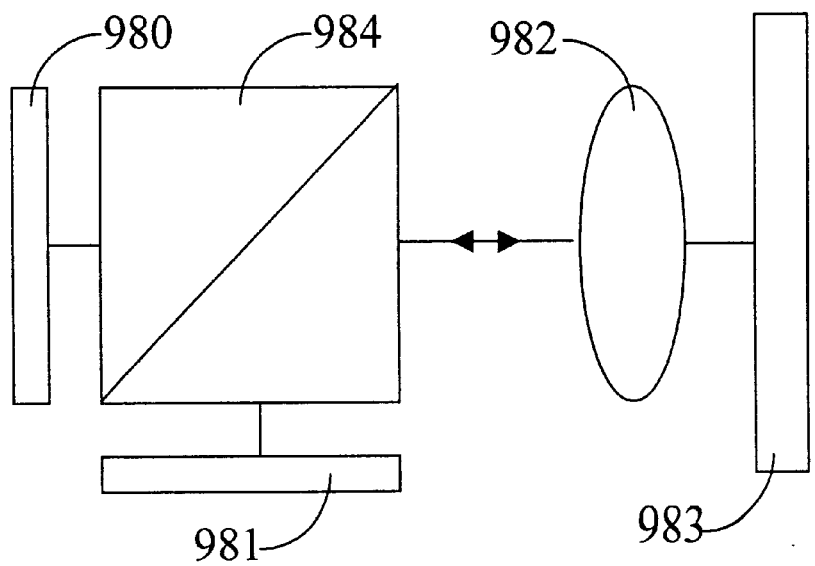
FIG. 9B is a schematic view of another type of two-photon fluorescence confocal microscope.

Two-Photon Scanning Fluorescence Microscope—
FIGS. 9A and 9B

The two-photon scanning fluorescence microscope was developed (U.S. Pat. No. 5,034,613) in order to reduce the problem, among others, associated with the photobleaching of fluorophores in the target material from the constant exposure to light. The microscope apparatus is very similar to a confocal microscope, but instead of exciting fluorescence with single photons of short wavelength light, the same fluorescence is excited by packs of two or more photons of long-wavelength light. The difficulty is that the two-photons must arrive nearly simultaneously to impart enough energy onto the target material to create fluorescence. The two-photon wavelength is usually in the near- or mid-infrared range with femto-second pulses. One advantage of the technique is that fluorescence occurs only in the focal volume, the three-dimensional area where the laser beam is focused and where the power density is high enough to excite fluorescence. The optical sectioning can be performed by excitation alone The two-photon microscope can penetrate deeper into tissue because its longer excitation wavelengths scatter less and the absence of the out-of-focus photodamage allows for higher laser powers. This feature provides depth of field resolution comparable to that produced by confocal scanning microscopes, allows construction of images by collecting two-photon excited fluorescence from each point in the scanned objects while still satisfying the requirement for very high excitation intensity obtained by focusing the laser beam and by pulse time compressing the beam.

As shown in FIG. 9A, such a device is obtained with proper electronic circuits modifications, by simultaneously emitting two-photons, one each, from two laser arrays 910 and 920, combined by a beamsplitter 940, to the tissue 970 via a lens system 960, the two-photon induced fluorescence is detected by a detector array or CCD 930 via a dichroic mirror 950 which reflects the fluorescence and transmits the excitation light. By sequentially exciting the lasers on the arrays on and off, fluorescence imaging may be obtained.

FIG. 9B is another design of the two-photon confocal fluorescence imaging. Laser/detector arrays 980 and 981 have spectral filters (for example, of the type shown in FIG. 3F). In this embodiment, the two laser beams (from 980 and 981) combined by a beamsplitter 984 illuminate points on the tissue 983 via lens system 982. This is done by having the combined laser/detector arrays 980 and 981 so that the excitation to provide the photons continues to be performed by two separate laser arrays, as in FIG. 9A, but the fluorescence from object 983 then passes directly through optical system 984. The fluorescence light will be detected by the corresponding two detectors on the arrays 980 and 981 respectively. Compared to FIG. 9A, a dichroic mirror is eliminated as is a separate detector array (separate from the laser array) and less of the light intensity is lost.

Figure 10A:
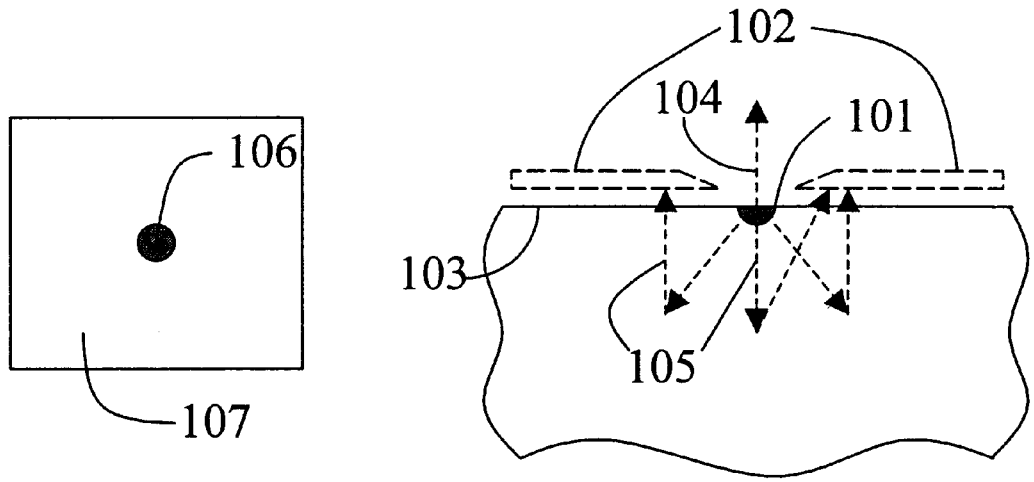
FIG. 10A is a schematic view of confocal imaging in direct pin-hole mode.
Figure 10B:
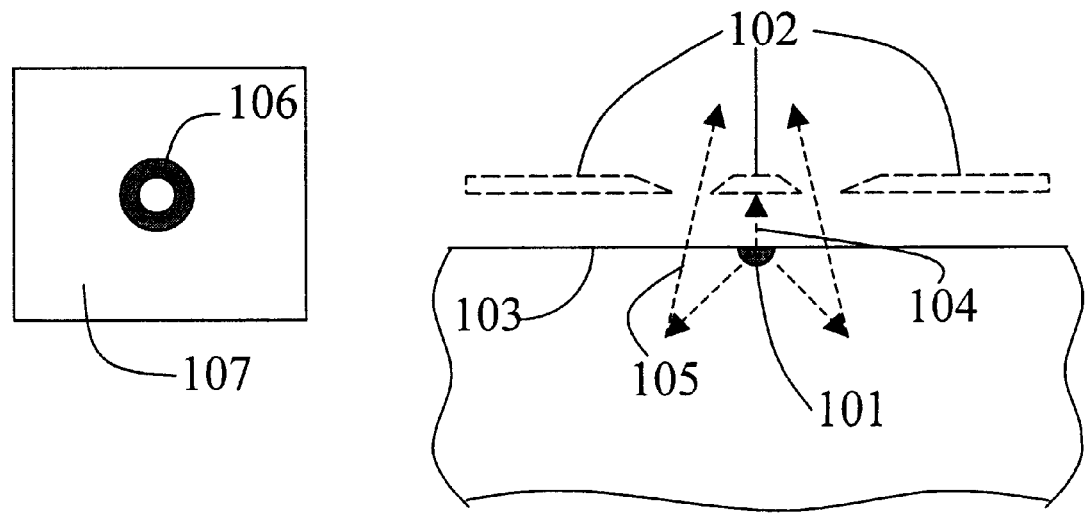
FIG. 10B is a schematic view of confocal imaging in indirect pin-hole mode.
Figure 11:
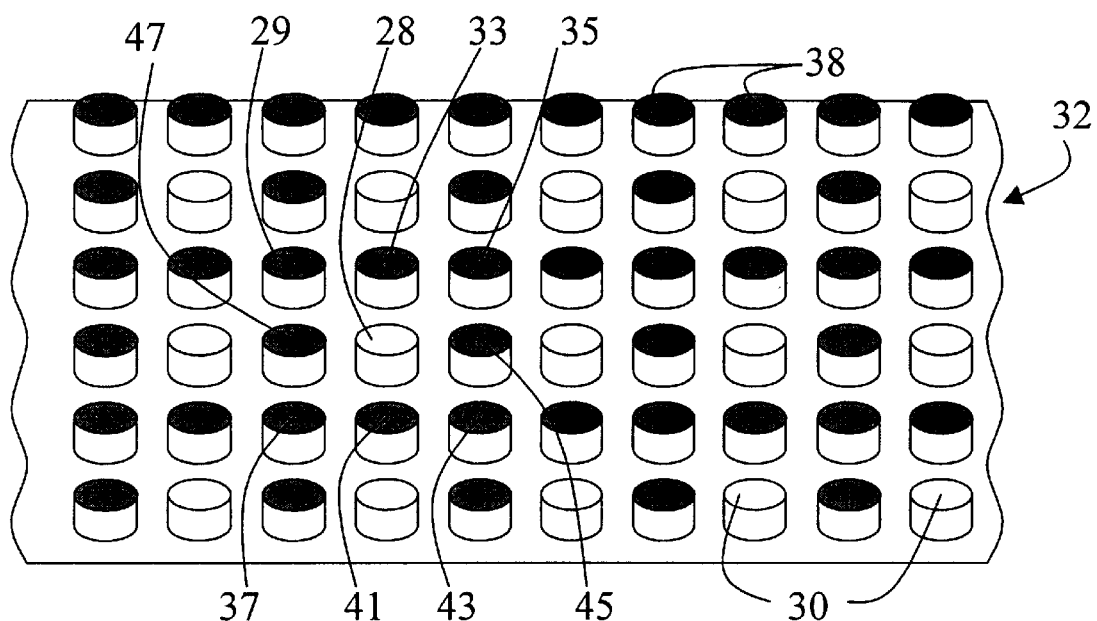
FIG. 11 is a pictorial view of a laser/detector array arranged for the indirect mode.

Indirect Scanning—Mode of Imaging—FIGS. 10A, 10B and 11

The present invention can be used not only in the confocal mode of imaging, but in the indirect mode also. The difference between these modes is explained in FIGS. 10A and 10B, shown for illustration purposes only, since the present invention does not use the type of apertures shown in these figures. The currently illuminated spot 101 on the object plane 103 is shown in these figures. The shape of detector aperture stop 102 in the same plane 103 determines which portion of the light, remitted from the object, will be detected.

In the confocal mode of imaging according to FIG. 10A, only the light 104 remitted directly from illuminated area 101, will be detected. The detector 106 in the image plane 107 is placed only within the boundary of the image of the illuminated spot 101. In the confocal scanning microscope of the present invention, the direct mode imaging can be seen to be achieved, for example, by turning on the laser 31 of FIG. 2B and the neighboring detector 39.

Referring to FIG. 10B, the light 104 directly remitted from the illuminated area 101 is not detected because the detector 106 in the image plane 107 has a ring-like shape, surrounding the area where the image of spot 101 would be located if the aperture 102 did not have the central circular area which blocks the direct light. In this mode, only the multiple-scattered light 105 can be detected. Generally speaking, the indirect mode of scanning imaging is realized when only unilluminated parts of the object are imaged.

The intensity of multiple-scattered light is affected by the absorption of examined tissue significantly more than that of reflected light. That perhaps is the reason its detection is found to be useful in eye examination [Webb et al., "Confocal Scanning Laser Ophthalmoscope". *Applied Optics* 1987, Vol. 26, No. 8, pp. 1492–1499] and cancer detection [Mourant et al. "Spectroscopic diagnosis of bladder cancer with elastic light scattering." *Lasers in Surgery and Medicine* 1995, Vol. 17, pp. 350–357].

According to the present invention, the indirect mode of imaging can be realized in the embodiments of FIGS. 5–7 without using bilens 73 and with another way of signal processing than described in FIG. 3C. Because of the absence of the bilens, only one spot of the object will be illuminated during the working period of each laser 30 in FIG. 2B, and the image of this spot will not be shifted in the plane of laser/detector array 32. Therefore, the directly reflected light will be placed onto the area occupied by the laser and will not be detected. The summary signal of six detectors neighboring to the working laser (3 above and 3 below) will represent the average level of the light that is multiple-scattered about a currently illuminated spot. The sequence of such summary signals, in accordance to the sequence of working lasers, will construct the image of object in indirect mode.

For example, In FIG. 2B, when a specific microlaser, such as microlaser 28 is illuminated, the six neighboring detectors, 29, 33, 35, 37, 41 and 43 receive the multiple-scattered light from the currently illuminated spot. If these detectors are arranged to be activated at the same time and coordinated with the illumination from microlaser 28, then an image in indirect mode can be constructed and viewed on a suitable display as described previously. While the indirect mode is possible to be used in this manner, the preferred manner of accomplishing this is described below.

The design of laser/detector array may be changed specifically for the indirect mode of imaging to obtain the best results. FIG. 11 shows the design of an array where each laser 30 is symmetrically surrounded by eight detectors 29, 33, 35, 37, 41, 43, 45 and 47, working simultaneously with this laser. Therefore, the level of summary signal of detected light is increased as compared to the embodiment shown in FIG. 2B and the pattern of detected multiple-scattered light is more symmetrical for the embodiment shown in FIG. 11.

It should be noted that while certain aspects of the present invention are shown in specific types of arrangements, they may be used with many of the other embodiments of the invention and are not limited to use with only the embodiment with which they are shown and described.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

We claim:

1. In a confocal scanning device for viewing an object, of the type including illumination means including an array of independently addressable microlasers, optical means for directing light generated by the illumination means onto an object and detection means including the array of detectors for detecting light from the object to which light from the illumination means has been directed;

the improvement comprising:

a. said array of microlasers and said array of detectors being in a single array; and b. said optical means directing light from the object onto said detection means.

2. In a confocal scanning device as defined in claim 1, where said array of microlasers and said array of detectors are on a single chip.

3. In a confocal scanning device as defined in claim 2, wherein there is at least one detector adjacent each microlaser and said optical means includes a bilens and an accompanying lens system.

4. In a confocal scanning device as defined in claim 3, wherein the accompanying lens system includes two objective lenses, and the relationship is as follows:

$$\Delta = \delta_1 f_1 / f_2$$

$$\delta_2 = \delta_1 f_3 / f_1$$

where $\Delta$ is the distance between the optical centers of the bilens, $\delta_2$ is the distance between sequentially illuminated points on the object, $\delta_1$ is the distance between neighboring elements in the array, the focal length of the bilens is $f_2$ and the focal length of the objective lens nearest the array is $f_1$ and the focal length of the objective lens furthest from the array is $f_3$.

5. In a confocal scanning device as defined in claim 2, wherein the detectors are individually addressable.

6. In a confocal scanning device as defined in claim 5 wherein the detector and laser addressing is coordinated to provide information at the detectors significant of the object being scanned.

7. In a confocal scanning imaging device as defined in claim 5, further comprising imaging device means for forming the image of an object from the information detected by said detection means.

8. In a confocal scanning imaging device as defined in claim 4 wherein the device is a microscope.

9. In a confocal scanning imaging device as defined in claim 4 wherein the device is an ophthalmoscope.

10. A confocal scanning device for viewing an object, comprising:

a. illumination means including an array of independently addressable microlasers;

b. detection means including an array of independently addressable detectors for detecting light from the object to which light from the illumination means has been directed, said array of microlasers and said array of detectors being in a single array and in a pattern constructed and arranged so that different detectors are adjacent each microlaser so that light from an illuminated object may be directed back to the vicinity of the illuminating microlaser and be detected by the adjacent detectors; and c. optical means for directing light generated by the microlasers onto the object and for directing light from the object so illuminated onto detectors adjacent the illuminating microlaser.

11. A confocal scanning device as defined in claim 10, further comprising means for controlling actuation of the independently addressable microlasers and detectors, wherein each microlaser has associated detectors, said actuation being in a predetermined sequence.

12. A confocal scanning device as defined in claim 11, wherein said means for controlling controls the microlasers and detectors to be actuated so that adjacent microlasers are actuated one after the other in a row.

13. A confocal scanning device as defined in claim 11, wherein said means for controlling controls the microlasers and detectors to be actuated so that nonadjacent microlasers are actuated one after the other.

14. A confocal scanning device as defined in claim 11, wherein said means for controlling controls the microlasers so that a plurality thereof and the associated detectors are actuated simultaneously, said simultaneously actuated microlasers being spaced from each other a sufficient distance that reflected and scattered light from one set of associated microlaser and detectors does not interfere with any other simultaneously actuated set of associated microlaser and detectors.

15. A confocal scanning device as defined in claim 10 where the optical system includes a bilens.

16. A confocal scanning device as defined in claim 15 wherein the device is an ophthalmoscope.

17. A confocal scanning device as defined in claim 15 wherein the device is a microscope.

18. A confocal scanning device as defined in claim 10 wherein the detector immediately adjacent the activated microlaser is activated at the same time.

19. A confocal scanning device as defined in claim 10, further comprising a bundle of fibers disposed between the microlaser/detector array and the object to provide a remote viewing of the object.

20. A confocal scanning imaging device as defined in claim 19 wherein the bundle of fibers is a coherent arrangement.

21. A confocal scanning imaging device as defined in claim 15 wherein the accompanying lens system includes two objective lenses, and the relationship is as follows:

$$\Delta = \delta_1 f_1 / f_2$$

$$\delta_2 = \delta_1 f_3 / f_1$$

where $\Delta$ is the distance between the optical centers of the bilens, $\delta_2$ is the distance between sequentially illuminated points on the object, $\delta_1$ is the distance between neighboring elements in the array, the focal length of the bilens is $f_2$ and the focal length of the objective lens nearest the array is $f_1$ and the focal length of the objective lens furthest from the array is $f_3$.

22. A confocal scanning imaging device for viewing an object, comprising:

a. illumination means including an array of independently addressable microlasers;

b. detection means including an array of independently addressable detectors for detecting light from an object to which light from the illumination means has been directed, said array of microlasers and said array of detectors being in a single combined array and in a pattern constructed and arranged so that different detectors are adjacent each microlaser so that light from an illuminated object may be transmitted back to the vicinity of the illuminating microlaser and be detected by the adjacent detectors;

c. optical means for directing light generated by the microlasers onto the object and for directing light from an object so illuminated onto detectors adjacent the illuminating microlaser; and d. imaging device means for forming an image of the object from the information detected by said detection means.

23. A confocal scanning imaging device as defined in claim 22, further comprising a bundle of fibers is disposed between the microlaser/detector array and the object to provide a remote viewing of the object.

24. A confocal scanning imaging device as defined in claim 23 wherein the bundle of fibers is a non-coherent arrangement.

25. A confocal scanning imaging device as defined in claim 23, wherein the bundle of fibers is a coherent arrangement.

26. A confocal scanning imaging device as defined in claim 22 wherein the device is arranged to operate in direct mode.

27. A confocal scanning imaging device as defined in claim 22 wherein the device is arranged to operate in indirect mode.

28. A confocal scanning imaging device as defined in claim 22 wherein the detectors immediately surrounding the activated microlaser are all activated for detection at the same time and the direct light transmitted from an object does not impinge upon any detector whereby the inactive mode is used.

29. A confocal scanning device as defined in claim 22 where the optical system includes a bilens.

30. A confocal scanning imaging device as defined in claim 29 wherein the accompanying lens system includes two objective lenses, and the relationship is as follows:

$$\Delta = \delta_1 f_1 / f_2$$

$$\delta_2 = \delta_1 f_3 / f_1$$

where $\Delta$ is the distance between the optical centers of the bilens, $\delta_2$ is the distance between sequentially illuminated points on the object, $\delta_1$ is the distance between neighboring elements in the array, the focal length of the bilens is $f_2$ and the focal length of the objective lens nearest the array is $f_1$ and the focal length of the objective lens furthest from the array is $f_3$.

31. An imaging device as defined in claim 22 further comprising a second combined array for producing two photon-induced excitations, said optical means combining the two-laser beams by a beam splitter or a mirror or lens, each combined array being two-dimensional detector arrays or charged-coupled devices (CCD) for detecting fluorescence, and said combined arrays including integrated circuits for modulating at femtoseconds range.

32. A confocal device as defined in claim 31 comprising means for assuring detection will be of fluorescence from the object.

33. A method for generating an image of an object, comprising the steps of:

a. generating time-variant electrical excitations, b. addressing said electrical excitations to microlasers in an array of independently addressable microlasers to generate non-overlapping beams of coherent light, c. directing said light onto the object, and d. detecting, in an array of detectors, light resulting from any of light scattering, light reflection, or light transmission from the object by independently addressing each detector in the array when it is to detect reflected and remitted light, e. the plane of said microlasers and the plane of said detecting being identical.

34. A method for generating an image of an object as defined in claim 33, wherein the microlaser array and the detector array are in a single array, and the spacing between lasers and detectors in said combined array is less than 90 μm.

35. A method for generating an image of an object as defined in claim 34, where the directing of light is accomplished by an optical system which includes a bilens and two objective lenses, and the relationship is as follows:

$$\Delta = \delta_1 f_1 / f_2$$

$$\delta_2 = \delta_1 f_3 / f_1$$

where $\Delta$ is the distance between the optical centers of the bilens, $\delta_2$ is the distance between sequentially illuminated points on the object, $\delta_1$ is the distance between neighboring elements in the array, the focal length of the bilens is $f_2$ and the focal length of the objective lens nearest the array is $f_1$ and the focal length of the objective lens furthest from the array is $f_3$.

36. A method for generating an image of an object as defined in claim 34, wherein the step of detecting includes the detecting of fluorescence from said object.

* * * * *